United States Patent
Boyraz et al.

(10) Patent No.: US 11,175,664 B1
(45) Date of Patent: Nov. 16, 2021

(54) NAVIGATION DIRECTLY FROM PERCEPTION DATA WITHOUT PRE-MAPPING

(71) Applicant: Amazon Technologies, Inc., Seattle, WA (US)

(72) Inventors: Hakan Boyraz, Seattle, WA (US); Marshall Tappen, Bainbridge Island, WA (US); Baoyuan Liu, Bellevue, WA (US); Xiaohan Nie, Lynnwood, WA (US); Sheng Chen, Seattle, WA (US); Christopher Brown, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 16/248,516

(22) Filed: Jan. 15, 2019

(51) Int. Cl.
| | |
|---|---|
| G05D 1/02 | (2020.01) |
| G06F 16/29 | (2019.01) |
| G06Q 10/08 | (2012.01) |
| B60P 3/00 | (2006.01) |
| G06K 9/00 | (2006.01) |
| G01C 21/34 | (2006.01) |

(52) U.S. Cl.
CPC ............ *G05D 1/0212* (2013.01); *B60P 3/007* (2013.01); *G01C 21/3453* (2013.01); *G05D 1/0246* (2013.01); *G05D 1/0278* (2013.01); *G06F 16/29* (2019.01); *G06K 9/00798* (2013.01); *G06K 9/00805* (2013.01); *G06Q 10/08355* (2013.01)

(58) Field of Classification Search
CPC .. G05D 1/0212; G05D 1/0278; G05D 1/0246; G06F 16/29; B60P 3/007; G06Q 10/08355; G06K 9/00805; G06K 9/00798; G01C 21/3453
See application file for complete search history.

(56) References Cited

U.S. PATENT DOCUMENTS

| | | | |
|---|---|---|---|
| 2019/0033856 A1* | 1/2019 | Ferguson | B65G 67/24 |
| 2020/0225044 A1* | 7/2020 | Tohriyama | G05D 1/0212 |
| 2021/0019536 A1* | 1/2021 | Motoyama | G06T 7/00 |

OTHER PUBLICATIONS https://github.com/magazino/move_base_flex, retrieved Jan. 15, 2019, 6 pages.
http://www.ros.org/reps/rep-0105.html, retrieved Jan. 15, 15, 2019, 7 pages.
https://github.com/anybotics/grid_map#start-of-content, retrieved Jan. 15, 2019, 13 pages.

* cited by examiner

*Primary Examiner* — Alan D Hutchinson
(74) *Attorney, Agent, or Firm* — Lowenstein Sandler LLP

(57) ABSTRACT

An autonomous delivery robot system to enable delivery of a product to a customer is described. One autonomous ground vehicle (AGV) includes a processing device that receives a delivery request comprising a route divided into multiple navigation segments and computes a navigable space from perception data stored in a perception map. The perception map is a robot-centered local map that stores the perception data indicative of the surroundings of the AGV. The processing device computes a cost inflation from the perception data stored in the perception map, determines a sub-goal that is on the navigable space and reachable by the AGV using the navigable space and the cost inflation, and determines a path to achieve the sub-goal using the using the navigable space and the cost inflation. The processing device controls one or more actuators to move along the path.

20 Claims, 14 Drawing Sheets

NAVIGATION DIRECTLY FROM PERCEPTION DATA WITHOUT PRE-MAPPING

BACKGROUND

Autonomous machines or autonomous robots can perceive an environment, make decisions based on what it perceives or on what it is programmed to recognize, and actuate one or more movements or manipulations within its environment. For example, using autonomous navigation, a robot can plan and execute a path of travel without human intervention. Conventionally, autonomous navigation robots use a high-definition, three-dimensional (3D) detailed map of an environment for perfect localization. For perfect localization, the autonomous navigation robots use expensive localization sensors along with the 3D detailed map, referred to as "pre-mapping." The use of perfect localization and the 3D 3D detailed map results in expensive offline data collection, continual map maintenance, and expensive equipment, such as high-performance sensors.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

Figure 1:
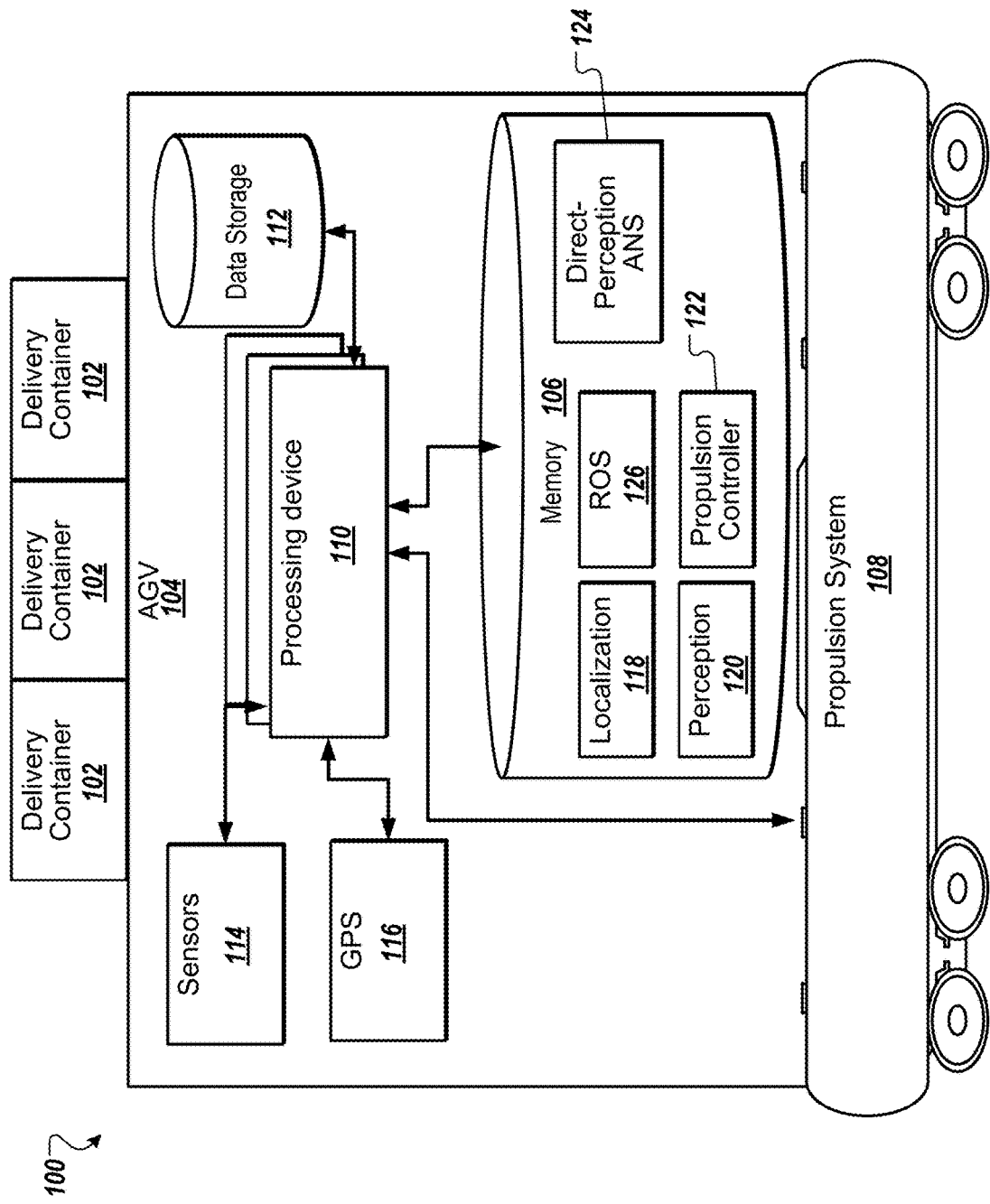
FIG. 1 is a block diagram of an autonomous delivery robot system to enable delivery of a product to a customer according to one embodiment.

An autonomous delivery robot system that enables delivery of a product to a customer is described. The autonomous delivery robot system includes one or more deliver containers and an autonomous ground vehicle (AGV). One AGV includes a processing device that receives a delivery request, which includes a route divided into multiple navigation segments, and computes a navigable space from perception data stored in a perception map. The perception map is a robot-centered local map that stores the perception data indicative of the surroundings of the AGV. The processing device computes a cost inflation from the perception data stored in the perception map, determines a sub-goal that is on the navigable space and reachable by the AGV using the navigable space and the cost inflation, and determines a path to achieve the sub-goal using the using the navigable space and the cost inflation. The processing device controls one or more actuators to move along the path.

The embodiments described herein rely on the AGV using online perception information to locate a path and navigate using this information without the conventional "pre-mapping," which requires a high-definition, 3D detailed map as described above. AGVs are robotic machines that move autonomously along the ground. Although the various embodiments are directed to unmanned robots that are autonomous ground vehicles that autonomously move along the ground, other embodiments may be incorporated in other vehicles that travel in air, in space, in water, or the like, where direct-perception navigation is possible. The autonomous robotic ground vehicles described herein are "unmanned," in that no humans are on board this ground vehicle. An unmanned and autonomous robotic ground vehicle travels under their own power and uses sensors and computational resources to travel along the ground.

In contrast, a conventional approach to autonomous navigation is to pre-map an environment and carefully identify driveable areas, signs, stop lights, and other features. In short, a detailed map of the environment needs to be determined beforehand and loaded into the autonomous robot. Using the pre-mapping of the detailed map, the autonomous robot uses sensors to localize itself relative to this pre-defined detailed map. Because the map is predefined and detailed, decisions on navigations become easier to make for the robot because it already has all the information about the environment and merely needs to detect obstacles or other unsafe operating conditions as it travels along a path as set forth in the pre-defined detailed map. This approached is generally referred to as "high-accuracy pre-mapping" or "perfect localization." With high-accuracy or perfect localization, such as centimeter-level localization, an autonomous robot does not need to understand the boundaries of a sidewalk at runtime in order to navigate. The autonomous robotic vehicle only relies on its sensors for localization and obstacle detection and avoidance. However, to obtain accurate localization, such as centimeter-level localization, the autonomous robotic vehicle requires very accurate sidewalk maps and expensive highly-accurate sensors for perfect localization. As noted above, the use of perfect localization and the 3D detailed map results in expensive offline data collection, continual map maintenance, and expensive equipment such as the high-performance sensors.

As described above, the embodiments described herein overcome the problems and challenges set forth above with respect to high-accuracy or perfect localization solutions by not using high-accuracy or perfect localization. That is, the autonomous robotic vehicle does not use a pre-defined detailed map of an environment and the accuracy requirements on localization are relaxed. The embodiments of the autonomous robotic vehicle can use online perception information to detect and locate a sidewalk and navigate using the perception information to follow the sidewalk for a specified distance (e.g., 200 meters). For online sidewalk detection, the autonomous robotic vehicle can use color cameras and perform semantic segmentation to obtain semantic information, the autonomous robotic vehicle projects pixel values to a two-dimensional (2D) local map using a plane homography. The autonomous robotic vehicle uses a 2D local map for robot navigation, the 2D map being referred to herein as a perception map. The 2D local map is not considered a pre-defined detailed map of the environment because the 2D local map is derived from the online perception information, as opposed to a detailed map of the environment that is generated prior to operation of the autonomous robotic vehicle as done conventionally. As a result, the embodiments of the autonomous robotic vehicle described herein can navigate without a high-definition map of the environment for perfect localization. Thus, aspects of the embodiments described herein can overcome the problems and deficiencies of the pre-mapping solutions. In particular, the embodiments described herein can reduce offline data collection, continual map maintenance, and sensor costs, as well as costs to update the pre-defined maps. The embodiments described herein provide a higher intelligence system with potentially cheaper localization sensors and simpler maps than the conventional solutions having potentially simpler intelligence, but expensive localization sensors and high-definition 3D maps of the environment.

The various embodiments described below are directed to a type of autonomous robotic vehicle for traveling on the ground, namely a direct-perception AGV. The embodiments of the direct-perception AGV provide a solution that works with uncertainty in localization without leaving a driveable area (e.g., without the AGV leaving the sidewalk). The driveable area may be considered a navigable space or a portion of the navigable space. The direct-perception AGV can include processing logic to understand boundaries of the driveable area, as well as to provide sub-goals that are reachable by the direct-perception AGV at all time to reach its final destination. That is, the processing logic can provide sub-goals that permit the direct-perception AGV to travel in a direction of a delivery route so that the direct-perception AGV would not drive into a road or a lawn, always travelling towards its final destination. Additional details are set forth below of how the direct-perception AGV works without high-definition detailed maps or perfect localization.

FIG. 1 is a block diagram of an autonomous delivery robot system 100 to enable delivery of a product to a customer according to one embodiment. The autonomous delivery robot system 100 includes one or more delivery containers 102, each to store one or more products to be delivered, and an autonomous ground vehicle (AGV) 104 coupled to the one or more delivery containers 102. The AGV 104 can include one or more memory devices 106, a propulsion system 108 of one or more actuators, and a processing device 110 coupled to the one or more memory devices 106 and the propulsion system 108. The AGV 104 may include additional components, such as data storage 112, sensors 114, a Global Positioning System (GPS) unit, radios, antennas, or the like. The sensors 114 may include one or more cameras of one or more types, accelerometers, inertial sensors, temperature sensors, proximity sensors, infrared sensors, pressure sensors, light sensors, ultrasonic sensors, humidity sensors, or the like. The radios may include cellular radios, wireless local area network (WLAN) radios, personal area network (PAN) radios, or the like. The one or more motorized actuators of the propulsion system 108 can include motors to drive wheels, tread systems, or other mechanisms to provide linear and rotational movements of the AGV 104. It should be noted that although one processing device 110 is illustrated, in other embodiments, multiple processing devices can be used. In other embodiments, the processing device 110 includes multiple execution threads that can perform the various operations described herein. In one system, an AGV can include actuators, one or more memory devices, and one or more processing devices, where at least one of the processing devices is located on the AGV.

In one embodiment, the memory device 106 stores instructions of a localization system 118, a perception system 120, a propulsion controller system 122, a robot operating system (ROS) 126, and a direct-perception autonomous navigation system (ANS) 124 for navigating directly from perception data without pre-mapping. Additional details of the localization system 118, the perception system 120, the ROS 126, and the propulsion controller system 122 are described in more detail below.

During operation, the processing device 110 executes the localization system 118, the perception system 120, the propulsion controller system 122, the ROS 126, and the direct-perception ANS 124. The direct-perception ANS 124 receives a delivery request that specifies a delivery route divided into one or more navigation segments. The delivery request can originate from another device or from software running on the AGV 104. The navigation segments can be various types, including a sidewalk, a crosswalk approach, or a crosswalk. A crosswalk can be a dedicated area of a road in which crossing of the road is legally permitted. Alternatively, the crosswalk can be any path across a road in which the AGV 104 can safely travel. The crosswalk approach can be a transition area between a sidewalk and the crosswalk. At times, the crosswalk approach has specific attributes that are different from the sidewalk and the crosswalk for which the AGV 104 should handle movement differently. For example, some crosswalk approaches are slanted between two levels that would require different movements by the AGV 104 for safe travel, as compared to movements by the AGV 104 on the sidewalk or the crosswalk. The type of segment can factor into decisions made by the direct-perception ANS 124 to navigate the AGV 104 safely and effectively to a destination. In other embodiments, the navigation segment may be other walkways, driveways, parking lots, passageways, ground planes, alleyways, hallways, breezeways, or other surfaces on which the AGV 104 can travel, regardless of whether the AGV 104 travels inside or outside of a building. Each segment can be defined by a set of waypoints, such as GPS waypoints. A waypoint is a reference point in physical space used for navigation. A waypoint can be an intermediate point on a route or line of travel. As described herein, a delivery route can be divided into multiple segments and each segment includes a set of one or more GPS waypoints. An endpoint, a destination, or a stopping point can also be categorized as a waypoint and designated as a final waypoint of a delivery route. The set of waypoints can be a series of GPS points to create an artificial path (or invisible path) for navigation. Various embodiments described herein utilize GPS waypoints that set fort the GPS coordinates of an end of a segment as represented as a position on the globe (i.e., longitudinal and latitudinal coordinates or a GPS point). A landmark refers to a waypoint that corresponds to an element of physical geography on land. When a waypoint corresponds to an element of physical geography on land.

The direct-perception ANS 124 can transform the set of GPS waypoints to a perception map frame managed by the localization system 118 and the perception system 120 as described herein. The perception map frame is a robot-centered local map that can be aligned with a baselink frame of the AGV 104 and an odom frame. An odom frame is a world-fixed frame. A robot's position in the odom frame can drift over time, without bounds and the robot position in the odom frame is guaranteed to be continuous and all local planning are done in the odom frame. Odom frame is different than a map frame. A map frame is a world-fixed frame with a z-axis pointing upwards and an x-axis pointing east. The robot's position in the map frame should not drift over time. This can be achieved by using the GPS 116. The map frame is not continuous and therefore not used for local planning and control. Although both the map frame and the odom frame can be Cartesian coordinates, these frames can be updated differently. In one embodiment, the odom frame is used according to a standard set forth for coordinate frames of mobile platforms used with the ROS 126. In another embodiment, the odom frame is used according to other requirements than those specified for mobile platforms using ROS 126.

The direct-perception ANS 124 can set a segment type of each segment of the delivery route with the perception system 120. The perception system 120 can compute a navigable space from semantic segmentation data and computes a cost inflation from obstacle data. For example, the semantic segmentation data may include a multi-segmented image provided by a semantic segmentation node. The semantic segmentation data can be used to detect and track a ground plane and differentiate the ground plane as one type of ground plane. In some cases, a three-segmented image provided by the semantic segmentation node tracks the ground plane types in the three-segmented image. The number of segmentation images depends on the number of cameras and field of view of each camera. For example, a single camera with larger field of view can be used, as well as two cameras or more than three cameras to cover a field of view, such as the full 360 degree. The embodiments described herein can accommodate as many segmentation images as needed for the particular system.

For each of the set of GPS waypoints of a segment, the direct-perception ANS 124 determines a sub-goal based on the navigable space and the cost inflation computed by the perception system 120. The sub-goal corresponds to a movement that is achievable by the AGV 104, in a direction of the delivery route, and is navigable by the AGV 104 based on the segment type. The direct-perception ANS 124 determines a path using the sub-goal and the navigable space and the cost inflation computed by the perception system. The direct-perception ANS 124 can set a new plan, having the path, with the propulsion controller system 122 to move the AGV 104 along the path. The direct-perception ANS 124 starts the movement of the AGV 104 along the path by the propulsion system 108 via the propulsion controller system 122. The propulsion control system 122 can receive the navigable space and cost inflation computed by the perception system 120 and determines whether the path is obstructed. The propulsion control system 122 can check for one or more obstructions in the perception data.

In one embodiment, the sensors 114 of AGV 104 include color cameras to obtain color images. The perception system 120 can derive a multi-segmented image from a color image. For example, the perception system 120 can generate three-segmented images from the color images. The multi-segmented images can be stored as perception data and the direct-perception ANS 124 can track ground plane types in the three-segmented images derived from the color images. The sensors 114 may also include stereo cameras (e.g., short-range stereo cameras) to obtain one or more depth images. The direct-perception ANS 124 can detect one or more obstacles above a ground plane using the depth images.

Although not illustrated in FIG. 1, the direct-perception ANS 124 can execute a navigation server by a first execution thread, the localization system 118 can execute a route manager by a second execution thread, and the perception system 120 can execute a perception map loop by a third execution thread. The navigation server initializes the delivery route and executes each of the navigation segments of the delivery route. The route manager tracks a position of the AGV 104 in a directional route graph and provides a next waypoint of the set of GPS waypoints to the navigation server. It should be noted that the next waypoint is within a reachable distance of the perception map. The route manager ensures that the AGV 104 moves forward in the directional route graph towards an end destination of the delivery route. The perception map loop tracks perception information about current surroundings of the AGV 104 and moves the perception map as the AGV 104 moves.

In another embodiment, the perception system 120 includes multiple asynchronous layers and one synchronous layer. For example, the perception system 120 includes a first perception map asynchronous layer that tracks ground plane types in three-segmented images in the semantic segmentation data; a second perception map asynchronous layer that detects an obstacle above a ground plane using depth images in the obstacle data; and a perception map synchronous layer to compute the navigable space from the semantic segmentation data and the cost inflation from the obstacle data based on the segment type. In a further embodiment, the direct-perception ANS 124 also includes a sub-goal planner executed by a fourth execution thread, a planner executed by a fifth execution thread, and a controller executed by a sixth execution thread. The sub-goal planner determines that the next waypoint is not on a navigable space due to at least one of a localization error, an annotation error, or an obstacle and maps the next waypoint to the sub-goal. The planner determines the path using the sub-goal and provides the path to the navigation server. The controller generates, using the plan, specific movements to be made by the AGV to move along the path.

In another embodiment, the AGV 104 can include one or more motorized actuators that permit the AGV 104 to travel, such as by linear translations or rotations that cause the AGV 104 to travel along a specified route. The AGV 104 includes at least the processing device 110 that is operatively coupled to the memory device 106 and one or more actuators, such as part of the propulsion system 108. The processing device 110 receives a delivery request that specifies a route divided into multiple navigation segments. The processing device 110 can receive the delivery request over a wired interface, a wireless interface, an internal interface, or the like. The processing device 110 computes a navigable space from perception data stored in a perception map, the perception data indicative of the surroundings of the AGV 104. The perception map is a robot-centered local map that stores the perception data and updates the perception data as the AGV 104 moves along the route. The processing device 110 computes a cost inflation from the perception data stored in the perception map. The processing device 110 determines a sub-goal that is on the navigable space and reachable by the AGV 104 using the navigable space and the cost inflation. The processing device 110 determines a path to achieve the sub-goal using the using the navigable space and the cost inflation. Once the path is determined, the processing device 110 controls the one or more actuators to move the AGV 104 along the path in the particular segment of the route.

In one embodiment, the perception data that is stored in the perception map includes semantic segmentation data and obstacle data. The processing device 110 navigates the AGV 104 directly from the perception data stored in the perception map as the AGV 104 moves along the route. In a further embodiment, a first camera obtains one or more color images and a second set of cameras obtains one or more depth images. The processing device 110 can perform semantic segmentation on the color images to derive multi-segmented images in which ground planes can be detected and tracked. That is, the processing device 110 can detect and track one or more ground plane types in the multi-segmented images. The processing device can detect and track one or more obstacles in the depth images. The multi-segmented images and the depth images can be stored as the perception data. Alternatively, the perception map loop can subscribe to receive ROS topics on the ROS topic interfaces from the perception system 120.

When the AGV 104 is used in connection with one or more delivery containers 102, the route can be a delivery route that is divided into navigations segments to deliver the product to an end destination. Alternatively, the route can be other types of routes that are not necessarily delivery routes. Each navigation segment of the delivery route can be defined as various types of navigation segments, but at least a sidewalk segment, a crosswalk segment, and a crosswalk approach segment, as described herein. Each navigation segment can include a set of GPS waypoints that the processing device 110 can transfer to a perception map frame that is the robot-centered local map. The processing device 110 can compute the navigable space from the perception data stored in the perception map based on a segment type of a current segment in which the AGV 104 is moving. The processing device 110 can compute the cost inflation based on the segment type of the current segment as well. The processing device 110 can determine the sub-goal that is on the navigable space and reachable by the AGV 104 using the navigable space and the cost inflation and the segment type.

In one embodiment, the processing device 110 executes a navigation server to initialize the delivery route and execute a segment of the multiple navigation segments and executes a route manager to track a position of the AGV 104 in a directional route graph and provide a next waypoint of the set of waypoints to the navigation server. The next waypoint is within a reachable distance of the perception map and moves the AGV 104 forward in the directional route graph towards an end destination of the delivery route. The processing device 110 can also execute a perception map loop to track the perception data indicative of the surroundings of the AGV 104 and update the perception data as the AGV 104 moves along the delivery route. The processing device can also executes a sub-goal planner to determine that a next waypoint is not on a navigable space due to at least one of a localization error, an annotation error, or an obstacle and to map the next waypoint to the sub-goal and executes a planner to determine the path using the sub-goal and provide the path to the navigation server. The navigation server, router manager, perception map loop, sub-goal planner, planner are described in more detail with respect to FIGS. 2-10.

Figure 8:
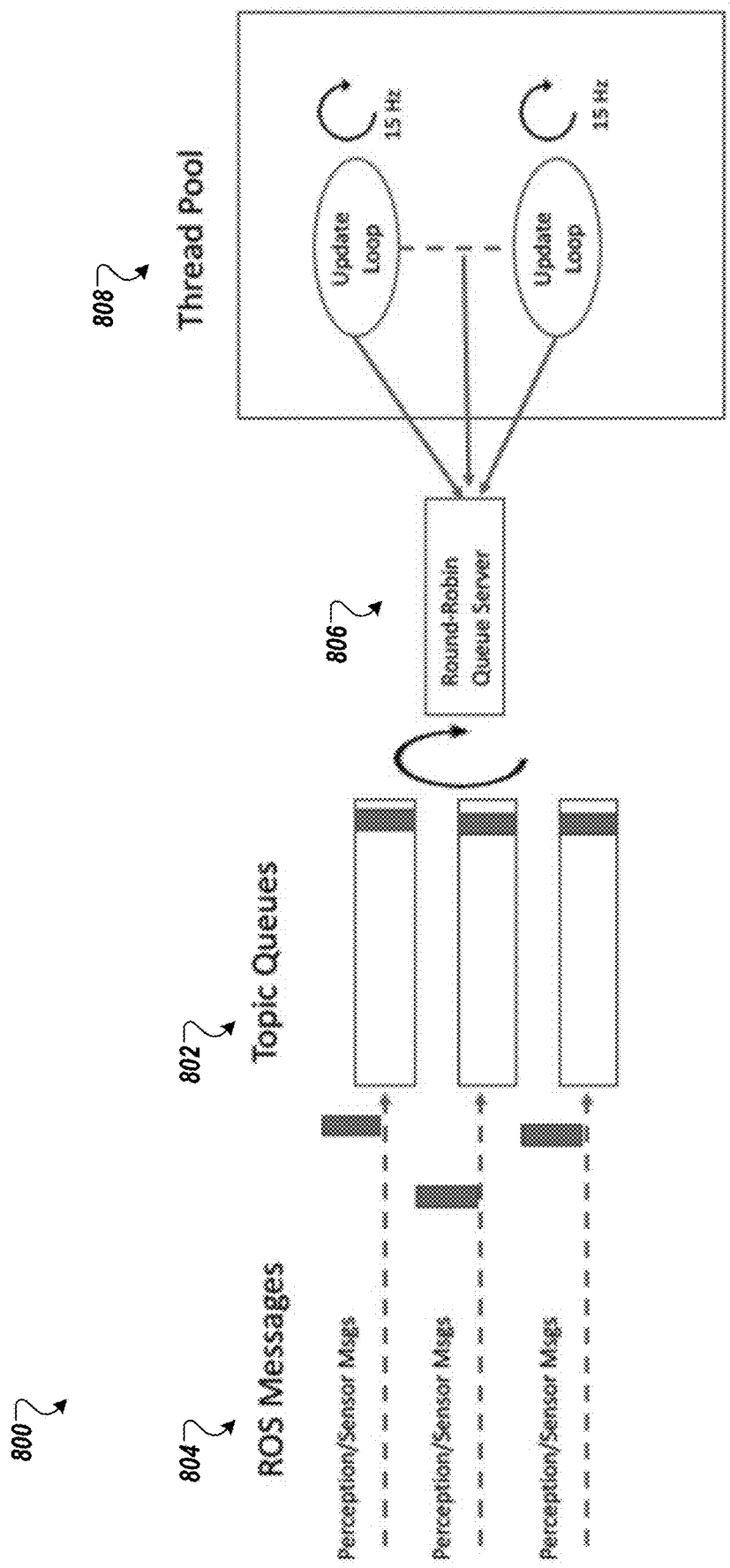
FIG. 8 is a diagram illustrating a perception map asynchronous layer according to one embodiment.

In another embodiment, the processing device implements a first perception map asynchronous layer to track ground plane types in three-segmented images in the semantic segmentation data, a second perception map asynchronous layer to detect an obstacle above a ground plane using depth images in the obstacle data, and a perception map synchronous layer to compute the navigable space from the semantic segmentation data and the cost inflation from the obstacle data based on a segment type of a current segment of the multiple navigation segments, such as illustrated and described with respect to FIG. 8. The processing device 110 can also implement a mobility manager to provide a ROS service interface to a client of an autonomy system to start, pause, resume, or cancel a delivery route and a navigation server to initialize the delivery route and execute a segment of the multiple navigation segments, such as described below with respect to FIG. 2. For example, the client of the autonomy system can be a task manager, such as illustrated and described with respect to FIG. 2. Alternatively, other types of on-board or off-board components can be used as the client to which the processing device 110 interfaces.

Figure 6:
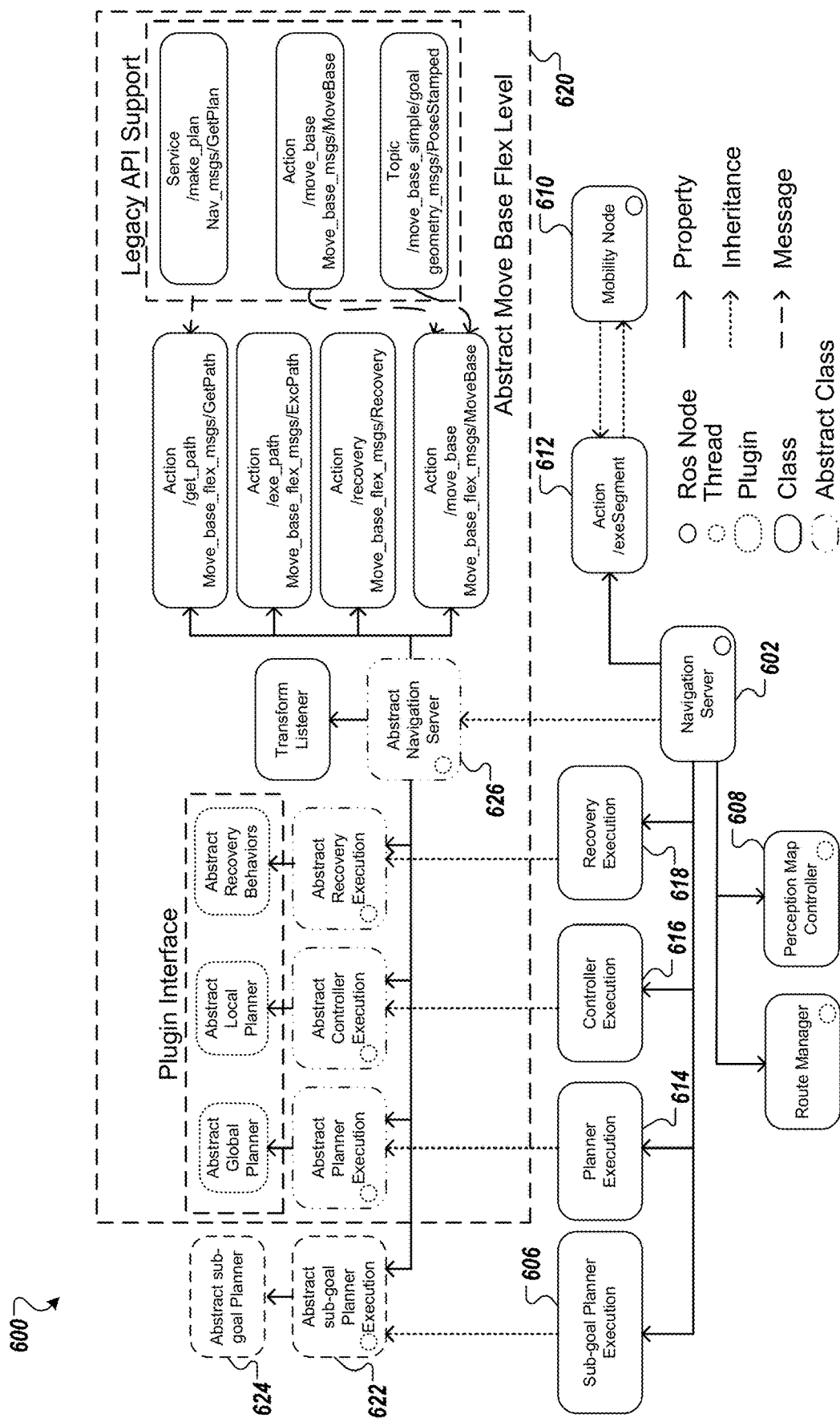
FIG. 6 is a block diagram illustrating a navigation server framework according to one embodiment.

In some embodiments, the direct-perception ANS 124 includes multiple execution blocks, such as: a sub-goal planner execution block to determine that a next waypoint of the set of waypoints is not on a navigable space due to at least one of a localization error, an annotation error, or an obstacle and map the next waypoint to the sub-goal; a planner execution block to determine the path using the sub-goal and provide the path to the navigation server; a route manager to track a position of the AGV 104 in a directional route graph and provide the next waypoint of the set of waypoints to the navigation server; a perception map loop tracks perception information about current surroundings of the AGV 104 and moves the perception map as the AGV 104 moves; and a controller execution block to control the one more motorized actuators, such as illustrated with respect to FIG. 6.

Figure 2:
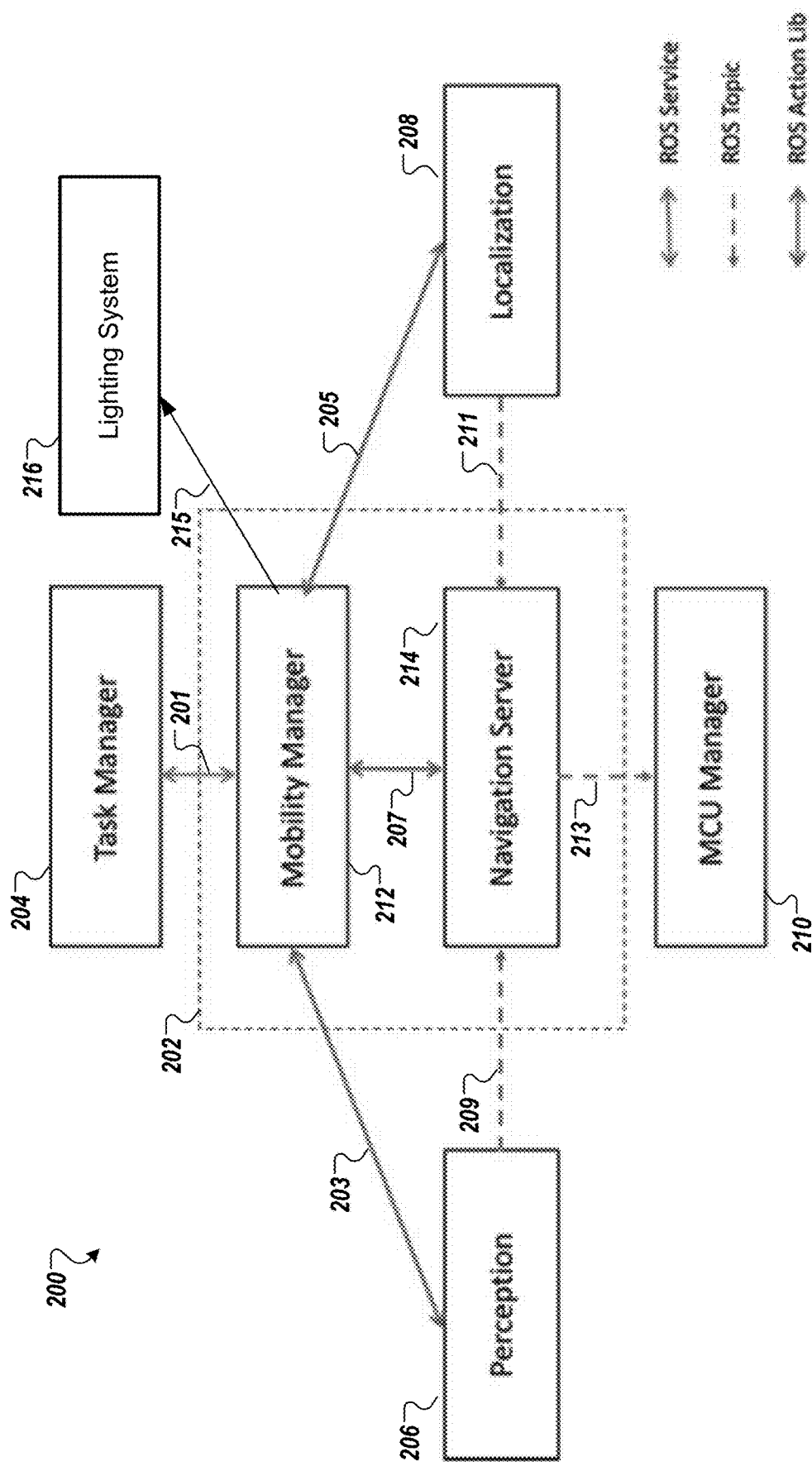
FIG. 2 is a block diagram illustrating a direct-perception autonomous navigation system (ANS) and other onboard software components according to one embodiment.

FIG. 2 is a block diagram illustrating a direct-perception autonomous navigation system (ANS) 202 and other onboard software components of an autonomous ground vehicle (AGV) 200 according to one embodiment. The AGV 200 includes the direct-perception ANS 124 that is operatively coupled to a task manager 204, a perception system 206, a localization system 208, and a microcontroller unit (MCU) manager 210. The MCU manager 210 is responsible for converting velocity or acceleration commands, provided by a higher-level controller algorithm, into current levels that drive one or more actuators of the propulsion system, such as current levels to drive wheel motors. In the depicted embodiment, the functionality of the direct-perception ANS 202 is separated between a mobility manager 212 and a navigation server 214.

FIG. 2 also illustrates interfaces between the direct-perception ANS 202 and the other onboard software components. In some embodiments, the interfaces can be robot operating system (ROS) service interfaces, ROS topic interfaces, and ROS action library interfaces. Alternatively, other types of interfaces may be used to communicatively couple the software components of the AGV 200. As illustrated in FIG. 2, the mobility manager 212 provides robot operating system (ROS) service interfaces 201 for the task manager 204 to start, pause, resume, and cancel missions. A mission is a delivery route that is divided into navigation segments. Each of the navigation segments includes a set of global positioning system (GPS) waypoints. A waypoint is an intermediate point or place on the delivery route, a stopping point on the delivery route, a point at which the course is changed. The delivery route can be a line of travel between two locations. The waypoint is typically expressed as coordinates to specify a position on the globe at each stage of the segment. GPS waypoints are waypoints that are expressed in terms of GPS coordinates. There can be strict requirements on how segments and waypoints are annotated.

Autonomous navigation starts when the task manager provides a new mission to the direct-perception ANS 202. A new mission includes a single delivery route which is divided into different navigation segments based on the navigation requirements. Although the different navigation segments can be defined for various environments, various embodiments described herein the direct-perception ANS 202 can support the following segment types: sidewalks, crosswalks, and crosswalk approaches, such as illustrated and described below with respect to FIG. 3.

Figure 3:
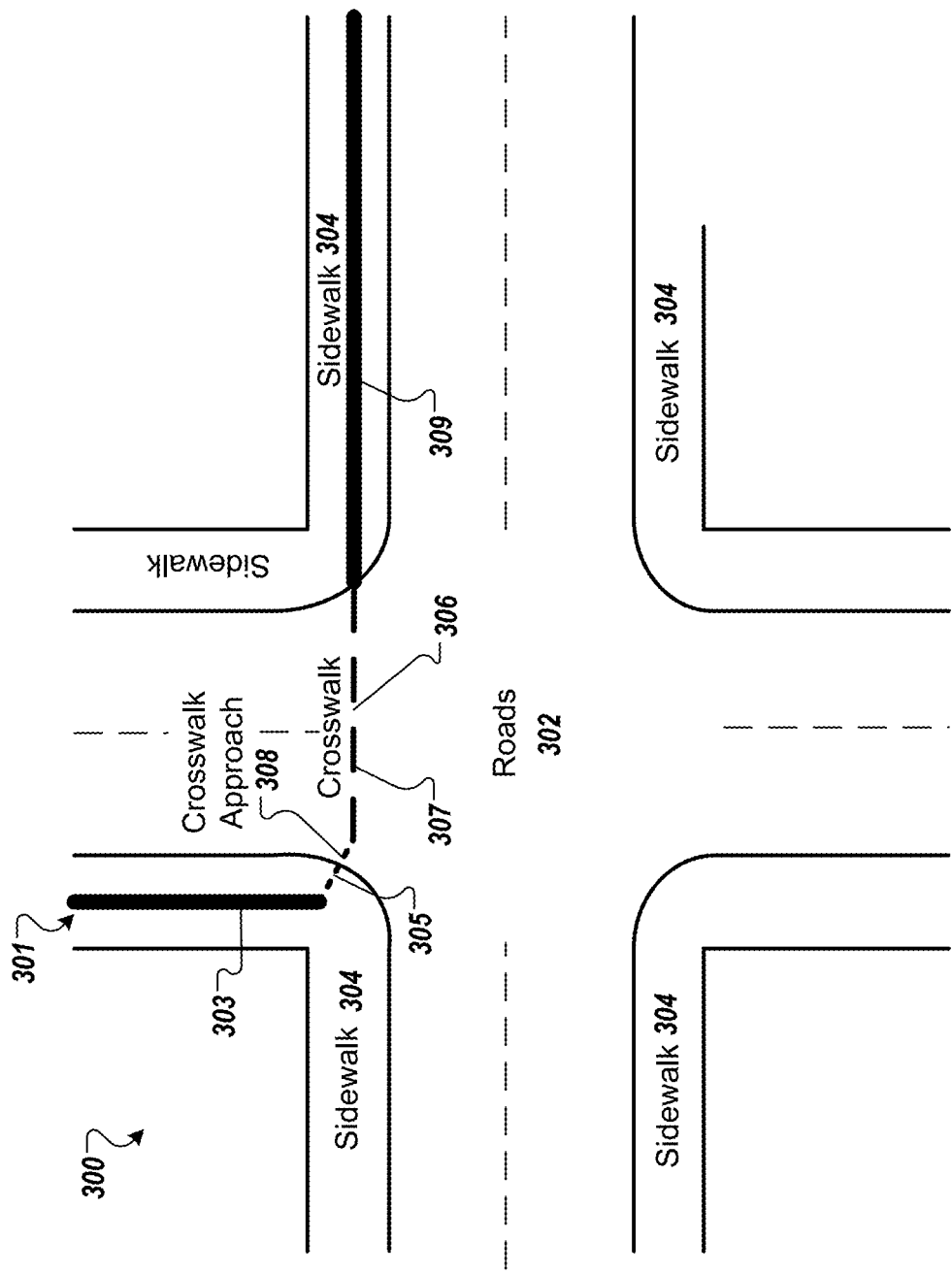
FIG. 3 is a diagram illustrating an environment including roads, sidewalks, crosswalks, and crosswalk approaches according to one embodiment.

FIG. 3 is a diagram illustrating a portion of a delivery route in an environment 300 including roads 302, sidewalks 304, crosswalks 306, and crosswalk approaches 308 according to one embodiment. The delivery route 301 includes a first segment 303 on a first sidewalk 304, a second segment 305 on a crosswalk approach 308, a third segment 307 on a crosswalk 306, and a fourth segment 309 on a second sidewalk 304.

Referring back to FIG. 2, the mobility manager 212, in addition to providing the ROS service interfaces 201 for the task manager 204, or other tasking components, to receive mission-level commands, the mobility manager 212 can provide synchronization across the perception system 206, localization system 208, and the navigation server 214, for example, using ROS action library interfaces 203, 205, and 207, respectively. The mobility manager 212 can handle transitions between different navigation segments, triggers autonomous and manual recovery behaviors, monitors system health of the AGV 200, and can handle deciding if it's safe to navigate the AGV 200. The mobility manager 212 can also interface with a lighting system to signal the AGV's intention via interface 215.

In one embodiment, the mobility manager 212 is implemented as a finite state machine to implement an execution flow. In another embodiment, the execution flow is implemented with behavior trees (BT), for example, the py_trees_ros framework. A behavior tree executes at a configurable rate and traces along the tree structure starting from a root node at each execution iteration of the behavior tree. None of the nodes should block the tree iteration. For this reason, Py_trees_ros can implement a "blackboard" object, which is a dictionary data structure that is accessible to all behaviors and composites and a separate thread or separate threads can be executed for communicating with other nodes and updating the data on the "blackboard". The ROS action library interface can be used for asynchronous communications with other nodes, such as the perception system 206, the localization system 208, and the navigation server 214, such as illustrated in an example data flow of the mobility manager 212 in FIG. 4.

Figure 4:
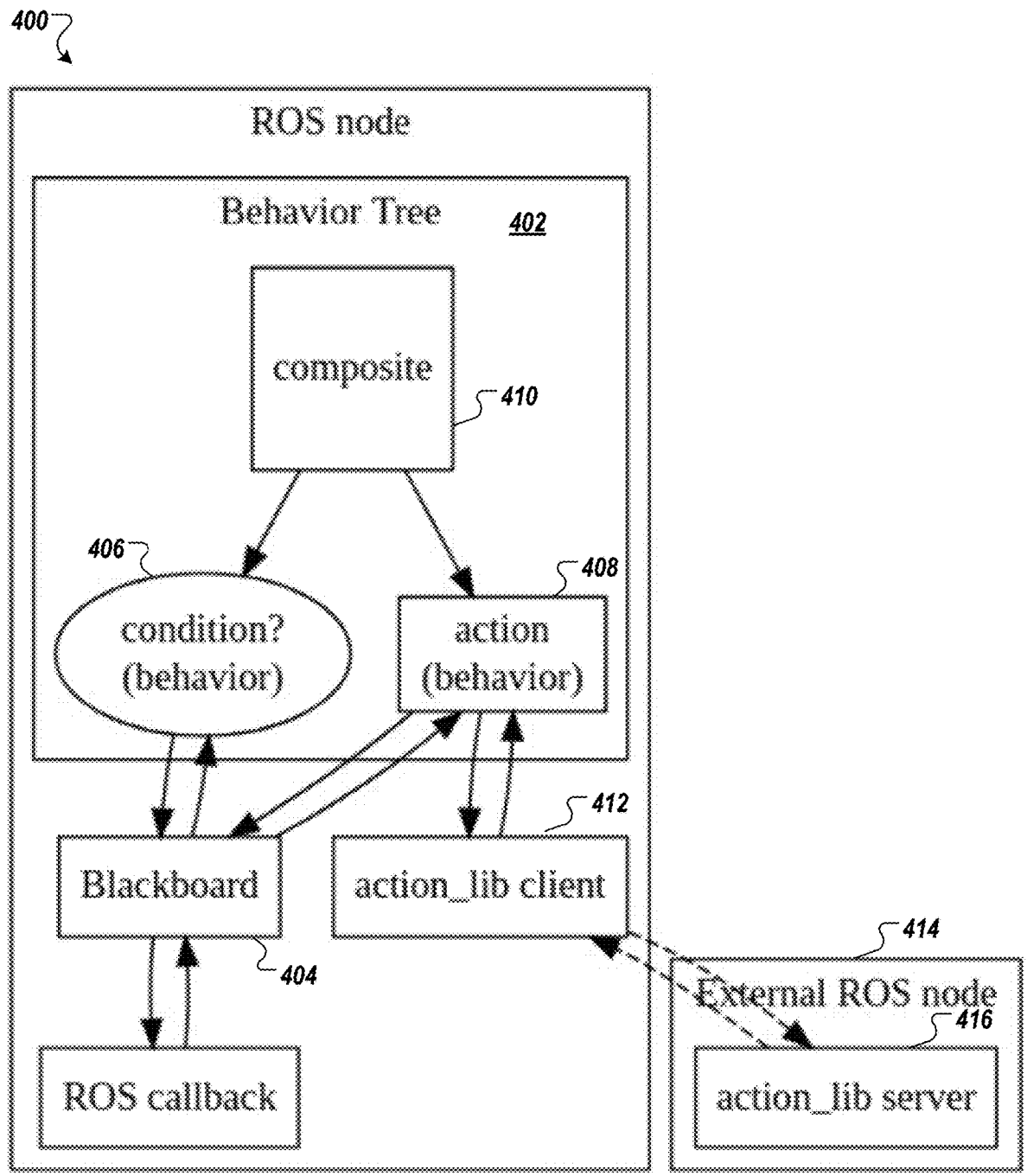
FIG. 4 is a diagram illustrating a behavior tree and a robot operating system (ROS) architecture of the mobility manager of FIG. 2 according to one embodiment.

FIG. 4 is a diagram illustrating a behavior tree and an ROS architecture of the mobility manager 212 of FIG. 2 according to one embodiment. The mobility manager 212 is represented as a ROS node 400 that implements a behavior tree 402. As noted above the ROS node 400 implements a blackboard object 404 that is accessible to all behaviors, including condition behaviors 406, action behaviors 408, and composites 410. The blackboard object 404 is a dictionary data structure. A separate thread can implement an action library client 412. The action library client 412 can communicate with an external ROS node 414 that executes an action library server 416. The action library client 412 can be used for asynchronous communications with the action library server 416. The external ROS node 414 can be any one of the other onboard software components, such as the perception system 206, the localization system 208, and the navigation server 214. An ROS callback can also access the blackboard object 404. An ROS callback is a method that is triggered when an event happens, such as a new message being received or the robot getting stuck. The ROS callback can provide an asynchronous mechanism to update the blackboard 404 without interrupt the execution of the behavior tree 402. Additional details of the behavior tree are illustrated and described below with respect to a sequence diagram of FIG. 5.

Figure 5:
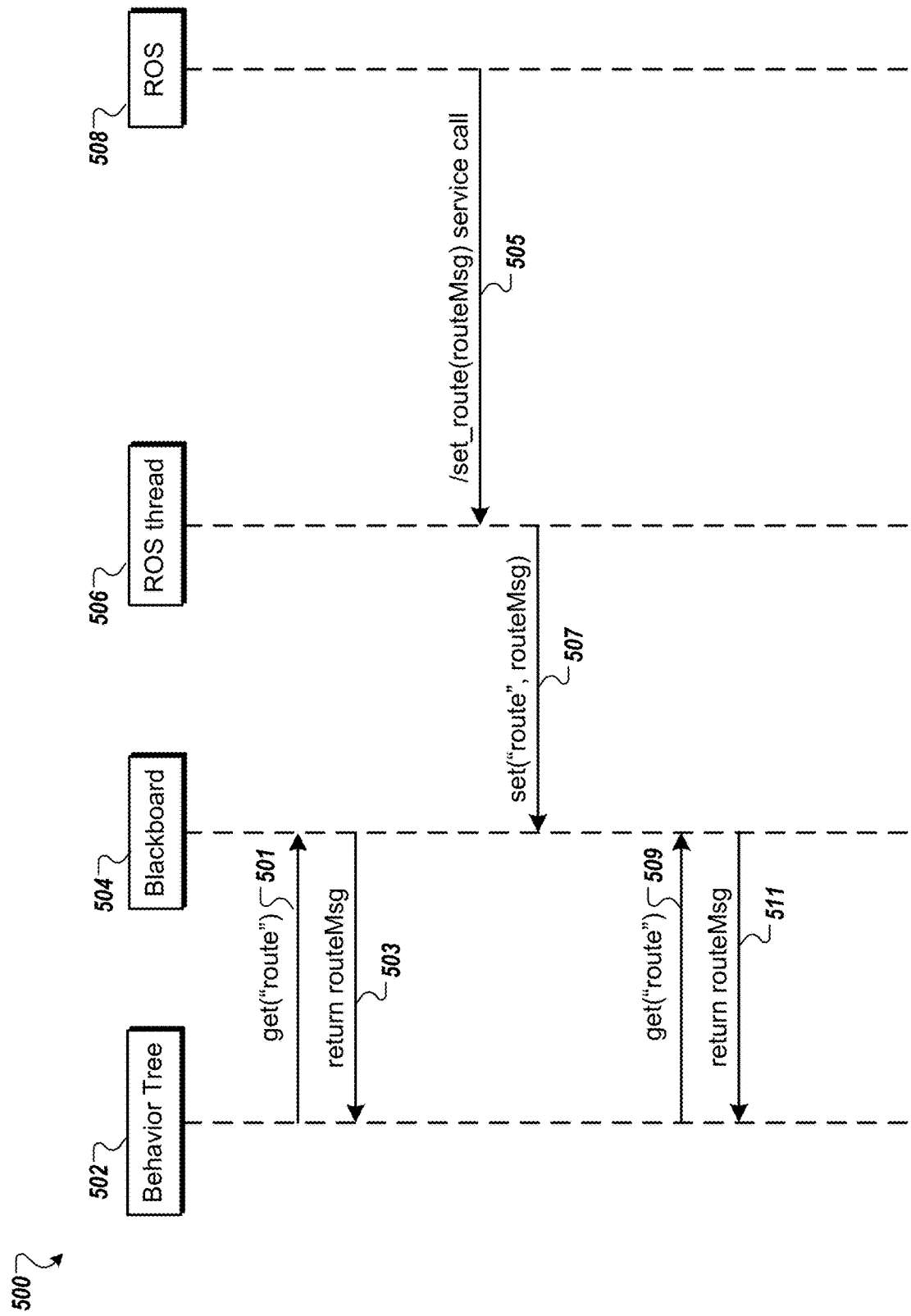
FIG. 5 is a sequence diagram of a behavior tree of an ROS node using a blackboard object according to one embodiment.

FIG. 5 is a sequence diagram 500 of a behavior tree of an ROS node using a blackboard object according to one embodiment. In the sequence diagram 500, a behavior tree 502 can periodically check to see if a delivery route has been set. For example, the behavior tree 502 can request a delivery route 501 from a blackboard object 504, such as using a call or command like get ("route"). The blackboard object 504 returns a response 503. Since no delivery route has been set, the return response 503 includes "no_route." At some point in time, a ROS thread 506 receives a service call 505 from an ROS 508 to set a delivery route, e.g., /set_route (routeMsg) service call. The service call 505 can include a route message. The ROS thread 506 sets the delivery route 507 in the blackboard object 504, e.g., set ("route", routeMsg). After the delivery route 507 is set in the blackboard object 504, the behavior tree 502 requests a delivery route 509 from the blackboard object 504, e.g., get ("route"). Since the delivery route 509 has been set, a return response 511 includes the route message, e.g., return routeMsg.

As described above, the mobility manager 212 communicates with the navigation server 214 via interface 207. Additional details regarding the navigation server 214 are described below with respect to FIG. 6. FIG. 6 shows a high-level architectural design for navigation server components of a navigation server framework based on Move Base Flex (MBF). MBF is an open source replacement for the ROS Move Base package. Although the navigation server framework of FIG. 6 is based on MBF, in other embodiments, other navigation server frameworks may be used.

FIG. 6 is a block diagram illustrating a navigation server framework 600 according to one embodiment. The navigation server framework 600 includes a navigation server 602, a route manager 604, a sub-goal planner 606, a perception map controller 608, a mobility node 610, a planner 614, a controller 616, and a recovery controller 618. The navigation server 602 can be similar to the navigation server 214 and the mobility node 610 can be similar to the mobility manager 212 as described above with respect to FIG. 2. The navigation server framework 600 utilizes the abstract move base flex (MBF) 620. At the lowest layer, the MBF 620 provides abstract interfaces for a planner, controller, and recovery behavior algorithms. Abstract interfaces are implemented as ROS plugins and can be loaded dynamically during run-time. Having common interfaces for our algorithms enables us to implement different algorithms in the various components for different navigation scenarios, such as for different navigation segments (e.g., one algorithm for a sidewalk and another algorithm for a crosswalk) and to switch between them during runtime. MBF abstract interfaces do not impose any data structures (such as Costmap 2D) to be used for sensor data. The cost map data or cost layer data provides a configurable structure that maintains information about where a robot should navigate in the form of an occupancy grid. The costmap uses sensor data to store and update information about obstacles.

As illustrated in FIG. 6, in addition to the abstract interfaces of the MBF 620, the navigation server framework 600 also includes abstract interfaces for the sub-goal planner, including abstract sub-goal planner interface 622 and abstract sub-goal planner plugin 624. The plugin interfaces and abstract interfaces in MBF 620 can be extended to use a custom perception map data structure for sharing the perception and cost data across different algorithms. It should be noted that above the plugin interfaces, MBF 620 provides abstract execution classes. Execution classes load algorithm plugins during initialization based on configuration files and they provide interface methods for switching, running and stopping algorithms. At the top layer, the abstract navigation server 626 provides action library interfaces for the clients to request navigation actions; get path, execute path, recovery, and move base. In one embodiment, the interfaces are extended to include "initialize route" and "execute segment." It should be noted that action library interfaces can be flexible and more interfaces can be implemented for other navigation features.

As illustrated in FIG. 6, the navigation server framework 600 has the route manager 604, the sub-goal planner 606, and the perception map controller 608. These components are described in more detail below.

The route manager 604 is responsible for keeping track of the robot's position in a directional route graph and feeding the waypoints that are within a reachable distance of a costmap of the robot. The basic requirements for route manager can be: 1) check if the robot's position in a map frame is within a specified distance (e.g., X meters) of the route graph. If the robot's position is outside error bounds, return an error code; 2) project the robot's position into a route graph and keep track of the robot's position within the route graph to support pause, resume, and cancel operations received from the task manager 204; 3) ensure that the robot is always moving forward in the route graph; and 4) provide the next waypoint (in an Odom frame) that's on the route that is within reach of the costmap. An odom frame is a world-fixed frame. A robot's position in the odom frame can drift over time, without bounds and the robot position in the odom frame is guaranteed to be continuous and all local planning are done in the odom frame.

As described above, an odom frame is different than a map frame. A map frame is a world-fixed frame with a z-axis pointing upwards and an x-axis pointing east. The robot's position in the map frame should not drift over time. This can be achieved by using the GPS 116. The map frame is not continuous and therefore not used for local planning and control. Although both the map frame and the odom frame can be Cartesian coordinates, these frames can be updated differently. In one embodiment, the odom frame is used according to a standard set forth for coordinate frames of mobile platforms used with the ROS. In another embodiment, the odom frame is used according to other requirements than those specified for mobile platforms using ROS.

It should be noted that the route manager 604 can use a projection error, which is a difference between the robot's position in the map frame and its position in route graph, to correct a map-odom transformation when providing the next waypoint. In another embodiment, the route manager 604 optionally uses landmark information from a perception map data structure (also referred to as perception map) to correct the robot's position estimate in the route graph.

During operation when a new mission starts, the route manager 604 can be initialized with mission route information in Earth coordinates (e.g., latitude and longitude). The route manager 604 uses a service provided by the localization system 208 to convert the waypoints to the map frame. During the mission, the route manager 604 only tracks the robot's position in the map frames and odom frames.

As noted above, when a waypoint is provided by the route manager 604, it is not guaranteed to be on a navigable space because the robot may be on a road or lawn due to localization errors, annotation errors, or the robot may be blocked by an obstacle. The sub-goal planner 606 can map the waypoint to a new sub-goal so that it is on navigable space and reachable by the robot. The sub-goal planner 606 can have different requirements for different navigation segments, such as first requirements for the sidewalk, second requirements for the crosswalk approach, and third requirements for the crosswalk. In other embodiments, additional navigation segments can have additional requirements that are similar or dissimilar to the requirements for the sidewalks, crosswalk approaches, and crosswalks. In one example, the sub-goal planner 606 can select a sub-goal that is closer to a lawn than a road during sidewalk navigation. When the sub-goal planner 606 selects this sub-goal, the sub-goal planner 606 can ensure that it will not take the robot very close to the obstacles or movement that would block cameras or other sensors of the robot. In another example, the sub-goal planner 606 continuously searches for a ramp and selects a sub-goal that brings the robot in alignment with the ramp during crosswalk approach navigation. In another embodiment, the sub-goal planner 606 can select a sub-goal that keeps the robot in a virtual tunnel during crosswalk navigation so that the robot does not drive into the road. The sub-goal planner 606 can search for the ramp on the other side of the crosswalk that leads to the other sidewalk to guide the robot to the ramp. In other embodiments, the sub-goal planner 606 can select other sub-goals to ensure that the robot travels on navigable space that is reachable by the robot.

Figure 7:
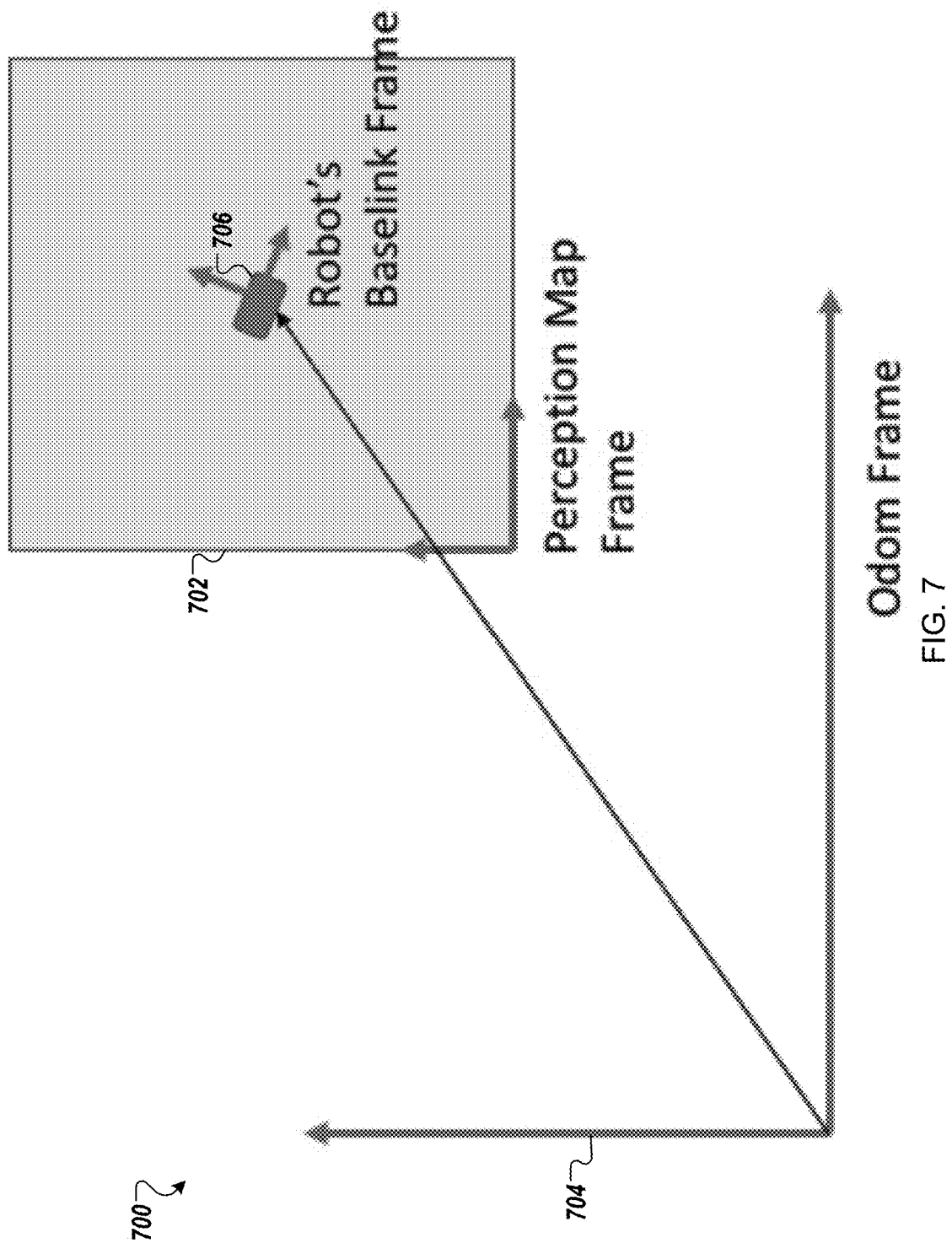
FIG. 7 illustrates a perception map frame aligned with an odom frame and a robot baselink frame according to one embodiment.

The perception map controller 608 can continuously keep up-to-date information about the robot's surroundings in the perception map data structure. The perception map data structure can be a replacement of the 2D ROS Costmap. The perception map data structure is aligned with an odom frame and uses a rolling window concept where the map position moves with the robot as shown in FIG. 7. The perception map controller 608 can use a multi-layered data structure for managing two-dimensional grid maps. In one embodiment, the perception map controller 608 uses ETH's GridMap data structure. The perception map controller 608 can provide additional capabilities over the GridMap data structure, such as multi-threading and asynchronous data updates. The perception map controller 608 supports both synchronous and asynchronous data layers as described in more detail below with respect to FIG. 8. Each asynchronous layer can register different perception topics or sensor topics and updates its data independent at a configurable update rate.

FIG. 7 illustrates a perception map frame 702 aligned with an odom frame 704 and a robot baselink frame 706 according to one embodiment. The perception map is an odom-aligned, robot centered local map. That is the perception map frame 702 is aligned to the odom frame 704 and is centered based on the robot baselink frame 706. As the robot moves as indicated in the robot baselink frame 706, the perception map frame 702 is updated by the perception map controller 608. The perception map frame 702 can be updated on a rolling window basis where the map location moves within the odom frame 704 as the robot baselink frame 706 moves. As noted above, the perception map frame 702 can be a replacement of the 2D ROS Costmap. The perception map frame 702 can also include landmark information so that the robot's position estimate can be corrected in the route graph.

The perception map controller 608 can use synchronous and asynchronous data layers to update the perception map frame 702. In one embodiment, the perception map controller 608 includes two asynchronous layers (segmentation and perception) and one synchronous layer (cost). The two asynchronous layers include a segmentation layer and an obstacle layer. The segmentation layer registers to three-segmented image topics provided by a semantic segmentation node. The semantic segmentation node can perform semantic segmentation on images captured by cameras and can classify ground plane types in the images to produce the three-segmented image topics. The segmentation layer can register to the three-segmented image topics to track the ground plane types using ground plane labels. For example, the segmentation layer can track ground plane labels for sidewalks, lawns, terrain, roads, curbs, ramps, driveways, or the like. The segmentation layer can update at a specified rate, such as 15 Hz per topic. The obstacle layer registers to depth images from short-range stereo cameras and detects obstacles above ground at a specified rate for the depth topic, such as 15 Hz per depth topic. One example of an asynchronous data layer that can be used to update the perception map frame 702 is illustrated in FIG. 8.

The synchronous cost layer can compute the navigable space and cost inflation from semantic segmentation information and obstacle data from the segmentation layer and obstacle layer, respectively. The synchronous cost layer can compute the navigable space and cost inflation based on the navigation segment type. As an example, a road is considered non-navigable space during sidewalk navigation, but the road is considered navigable during crosswalk navigation. Also, there can be potentially different inflation along the road-sidewalk edges, as compared to sidewalk-lawn edges. In other embodiments, additional synchronous cost layers can be implemented. The synchronous cost layers can be updated in a main loop of the perception map controller at a specified rate, such as 15 Hz.

FIG. 8 is a diagram illustrating a perception map asynchronous layer 800 according to one embodiment. The perception map asynchronous layer 800 includes multiple topic queues 802 that receive ROS messages 804. The ROS messages 804 can include perception messages, sensor messages, or the like. For example, one topic queue is registered to receive three-segmented images from a semantic segmentation node. Another topic queue is registered to receive depth images from the short-range stereo cameras. The perception map asynchronous layer 800 also includes a queue server 806, such as a round-robin queue server, that schedules a thread from a thread pool 808 to process one of the messages in the topic queues 802. The thread pool 808 can have multiple update loops that update at a specified rate, such as 15 Hz. An update loop can update the perception map data structure based on the ROS messages 804 received at the topic queues 802. In one embodiment, the perception map asynchronous layer 800 implements both the asynchronous segmentation layer and the synchronous obstacle layer. In another embodiment, the perception map asynchronous layer can implement other synchronous layers.

It should be noted that if any of the components described above return an error and the planning loop cannot succeed after a number of retries, the navigation server 602 returns a failure code to the mobility node 610. In this situation, the mobility node 610 mobility can request to perform a set of recovery algorithms of the recovery controller 618 via the navigation server 602 based on the navigation segment type. If the robot cannot recover from the failure, it would request an assisted recovery. All transitions between the different recovery strategies by the recovery controller 618 can be managed by the mobility node 610.

Additional details are set forth with respect to the following methods illustrated in the exemplary sequence and flow diagrams. Methods 900, 1000, 1100, and 1200 of FIGS. 9A-12 can be performed by processing logic that may comprise hardware (e.g., circuitry, dedicated logic, programmable logic, microcode, etc.), software (e.g., instructions run on a processing device), or a combination thereof. In one embodiment, the autonomous delivery robot system 100 or AGV 104 of FIG. 1 performs the methods 900, 1000, 1100, and 1200. In another embodiment, the AGV 200 of FIG. 2 performs the methods 900, 1000, 1100, and 1200. In another embodiment, some of the operations of methods 900, 1000, 1100, and 1200 can be performed by the components illustrated in FIGS. 4-6 and 8. Alternatively, other components of the autonomous delivery robot systems or AGVs described herein can perform some or all of the operations of the methods 900, 1000, 1100, and 1200.

Figure 9A:
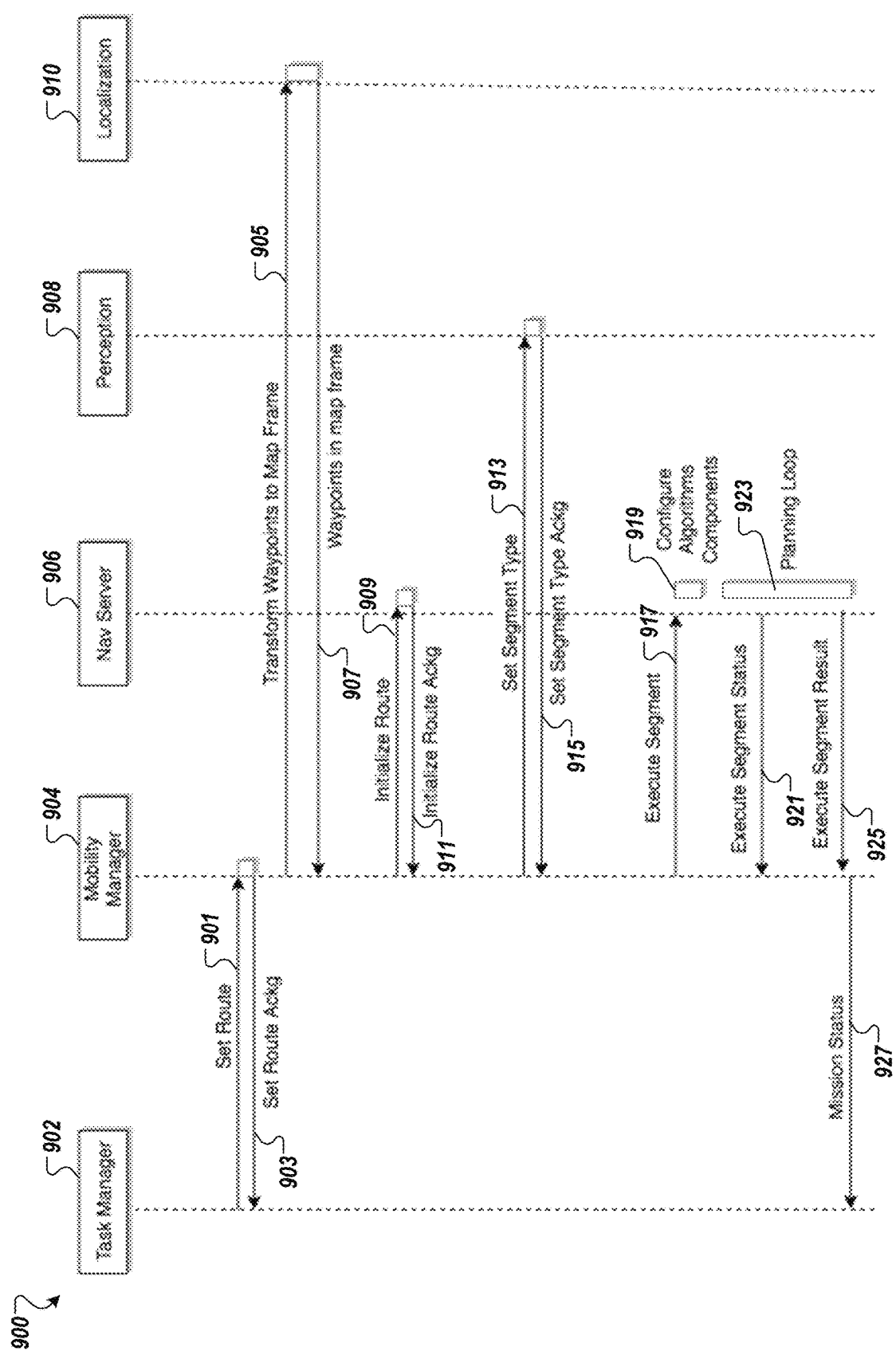
FIGS. 9A-9B are sequence diagrams of a method of operation of an autonomous delivery robot system to deliver a product to a customer according to one embodiment.
Figure 9B:
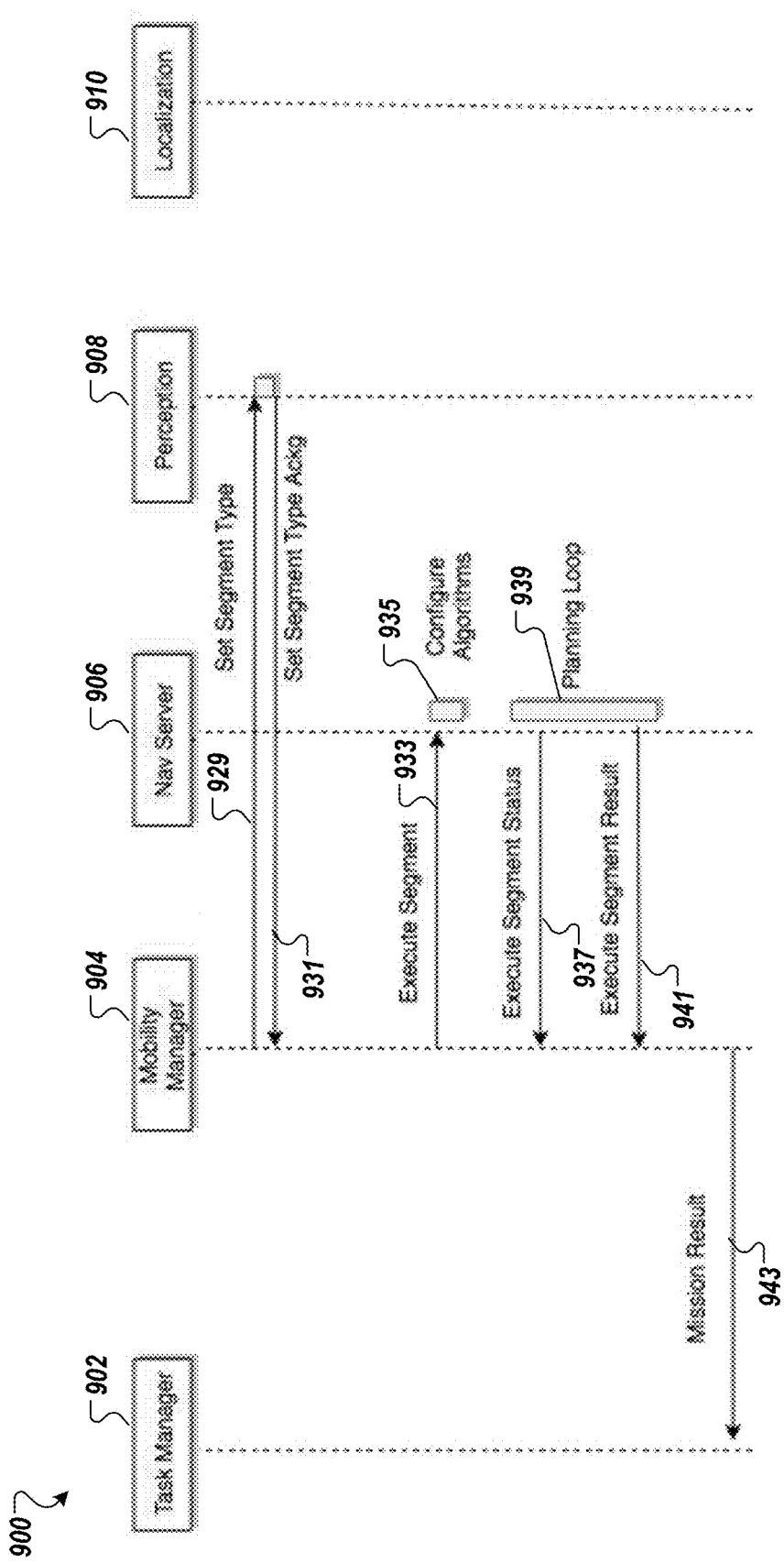

FIGS. 9A-9B are sequence diagrams of a method 900 of operation of an autonomous delivery robot system to deliver a product to a customer according to one embodiment. The method 900 begins by a task manager 902 sending a delivery request 901 to a mobility manager 904 (e.g., Set Route). The mobility manager 904 can correspond to the mobility manager 212 of FIG. 2 or the mobility node 610 of FIG. 6. The delivery request 901 includes a delivery route divided into multiple navigation segments. Each navigation segment includes a set of GPS waypoints. The mobility manager 904 can send an acknowledgment response 903 to confirm that the delivery route is set (e.g., Set Route Ackg). The mobility manager 904 can transform the GPS waypoints to a map frame by sending the GPS waypoints 905 to a localization system 910. The localization system 910 can return the GPS waypoints in the map frame 907 to the mobility manager 904. The mobility manager 904 can initialize the delivery route by sending an initialize route request 909 to a navigation server 906. The navigation server 906 can correspond to the navigation server 214 of FIG. 2 or the navigation server 602 of FIG. 6. The navigation server 906 can initialize the delivery route and send an acknowledgment 911 back to the mobility manager 904, acknowledging the initialize route request 909. The mobility manager 904 can set a segment type of a first segment by sending a set segment type request 913 to a perception system 908. The perception system 908 can set the segment type for the first segment and send an acknowledgment 915 back to the mobility manager 904, acknowledging the set segment type request 913. The mobility manager 904 can execute the first segment by sending an execute segment request 917 to the navigation server 906. The navigation server 906 can configure algorithms of the components (at block 919) and execute a planning loop (at block 923) to execute the second segment. The details of the blocks 919 and 923 are described below with respect to FIGS. 10 and 11, respectively. The navigation server 906 can send one or more execute segment statuses 921 back to the mobility manager 904 while in the planning loop 923. After completing the planning loop 923, the navigation server 906 sends an execute segment result 925 back to the mobility manager 904. The execute segment result 925 can indicate that the first segment is completed. When there are more segments to complete in the delivery route (i.e., the mission), the mobility manager 904 can start the next segment, as illustrated and described with respect to FIG. 9B.

Referring now to FIG. 9B, the mobility manager 904 can set a segment type of a second segment by sending a set segment type request 929 to the perception system 918. The perception system 908 can set the segment type for the second segment and send an acknowledgment 931 back to the mobility manager 904, acknowledging the set segment type request 929. The mobility manager 904 can execute the second segment by sending an execute segment request 933 to the navigation server 906. The navigation server 906 can configure algorithms of the components (at block 935) and execute a planning loop (at block 939) to execute the second segment. The details of the blocks 935 and 939 are described below with respect to FIGS. 10 and 11, respectively. The navigation server 906 can send one or more execute segment statuses 937 back to the mobility manager 904 while in the planning loop 939. After completing the planning loop 939, the navigation server 906 sends an execute segment result 941 back to the mobility manager 904. The execute segment result 941 can indicate that the second segment is completed. When there are no more segments to complete in the delivery route (i.e., the mission), the mobility manager 904 can send a mission result 943 back to the task manager 902. The mission result 943 can indicate that the delivery route (mission) is completed. Subsequent to the mission result 943, the task manager 902 can set another delivery route or a return route.

Although not illustrated in FIGS. 9A-9B, it should be noted that if any of the components described above return an error and the planning loop cannot succeed after a number of retries, the navigation server 906 returns a failure code to the mobility manager 904. In this situation, mobility manager 904 can request to perform a set of recovery algorithms from navigation server 906 based on the navigation segment type. If the robot cannot recover from the failure, it would request an assisted recovery. All transitions between the different recovery strategies can be managed by the mobility manager 904.

Figure 10:
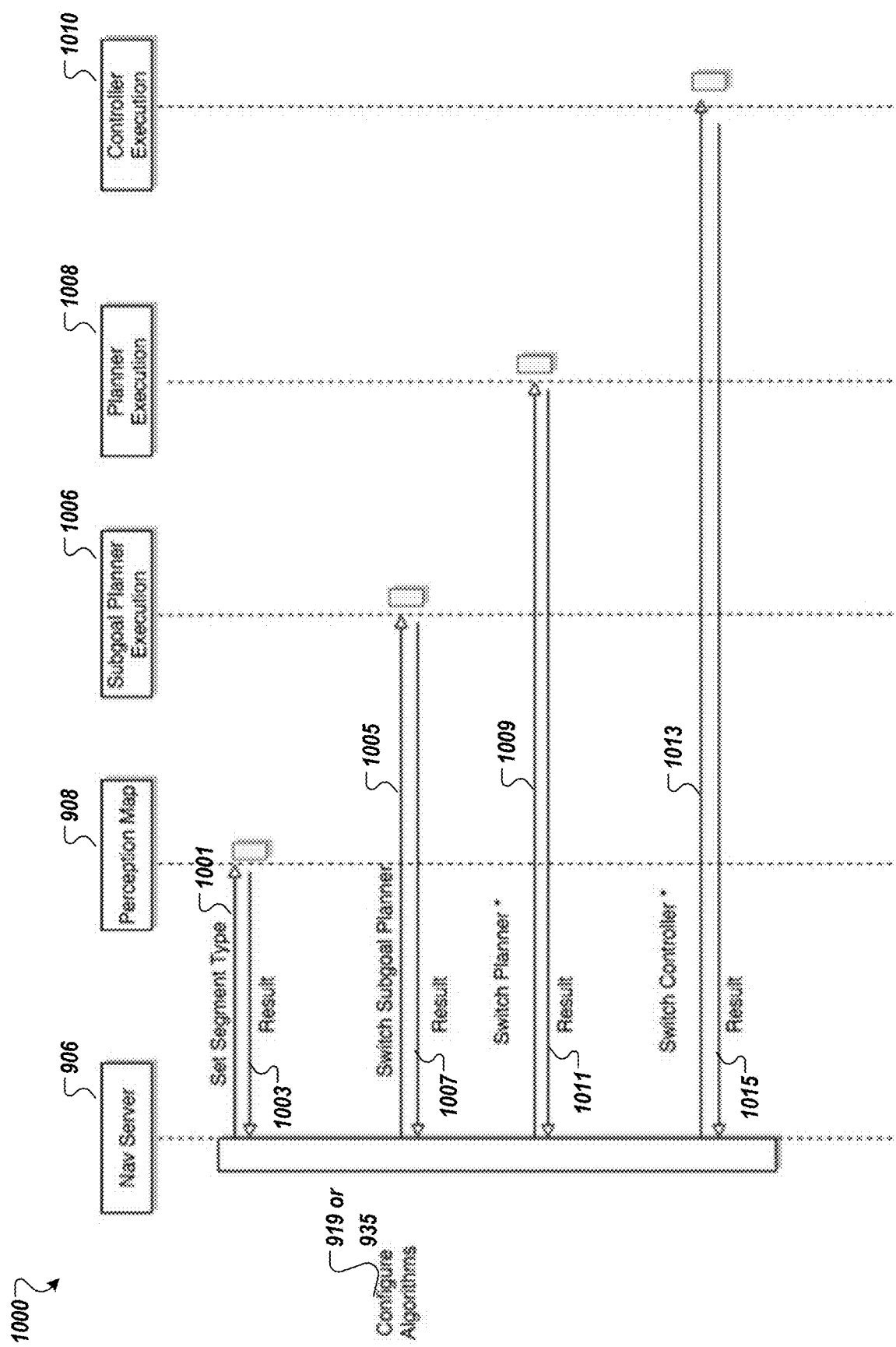
FIG. 10 is a sequence diagram of a method of configuring algorithms of a navigation server of the autonomous delivery robot system according to one embodiment.
Figure 11:
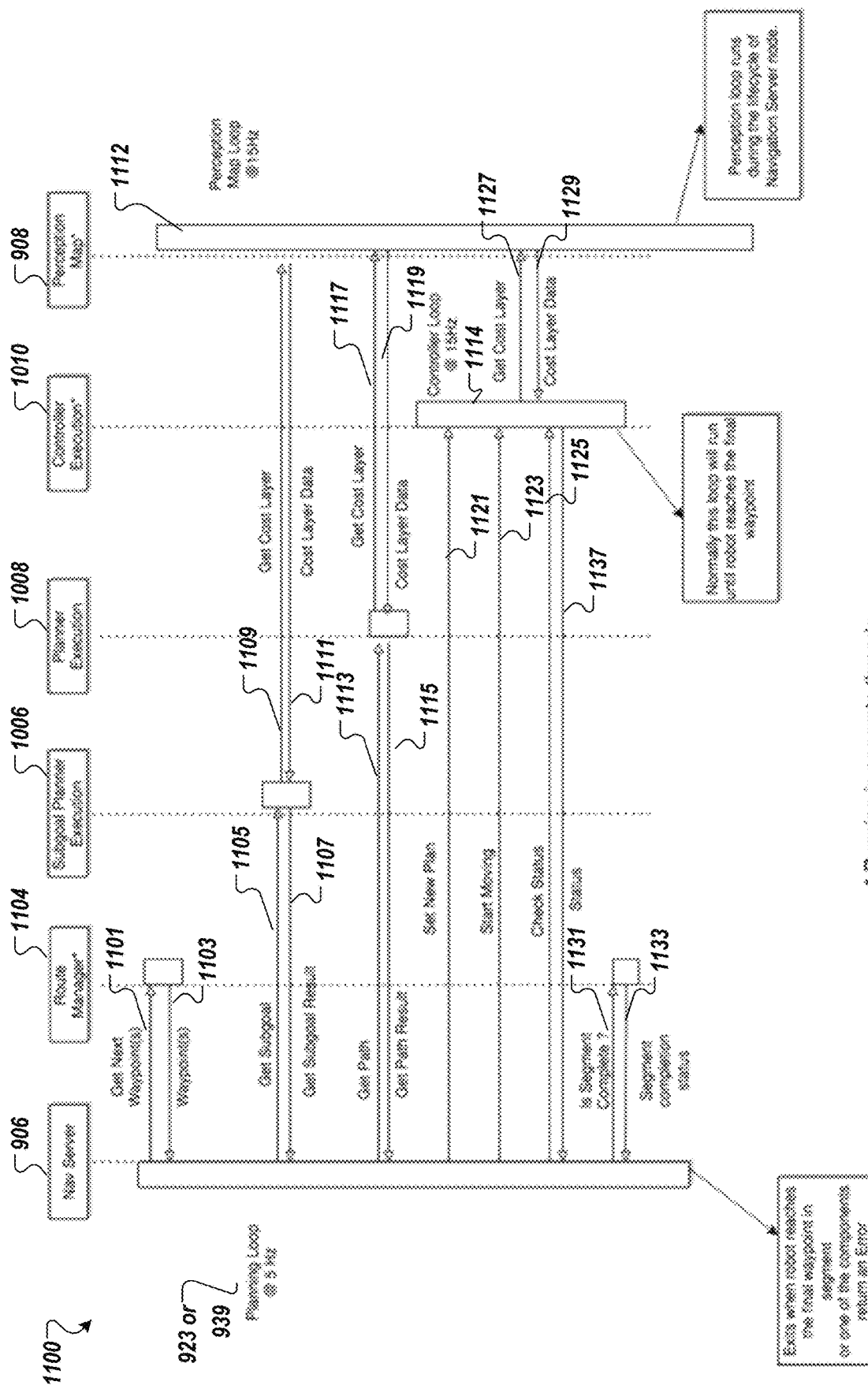
FIG. 11 is a sequence diagram of a method of a planning loop of a navigation server of the autonomous delivery robot system according to one embodiment.

As described above, the navigation server 906 can configure algorithms of the components at block 919 or 935, such as illustrated in more detail in FIG. 10, and can execute a planning loop at block 923 or 939, such as illustrated in more detail in FIG. 11.

FIG. 10 is a sequence diagram of a method 1000 of configuring algorithms of a navigation server of the autonomous delivery robot system according to one embodiment. As part of configuring algorithms at blocks 919 or 935 of FIGS. 9A-9B, the method 1000 can be performed. The navigation server 906 can set a segment type of a first segment by sending a set segment type request 1001 to the perception system 908. The perception system 908 can set the segment type for the first segment and send an acknowledgment 1003 back to the navigation server 906, acknowledging the set segment type request 1001. The navigation server 906 can switch on a sub-goal planner execution 1006 by sending a switch sub-goal planner request 1005 to the sub-goal planner execution 1006. The sub-goal planner execution 1006 sends a result 1007 back to the navigation server, acknowledging the switch sub-goal planner request 1005. There can be different algorithms or different parameters used to change the behavior of the algorithms for different navigation segment types. As an example, the sub-goal planner execution 1006 can return a goal in the middle of the sidewalk when the navigation segment is a sidewalk and can return a different goal, such as increasing speed when the navigation segment is a crossing. That is, the sub-goal planner execution 1006 can have separate logic for crossing a street than logic used for traveling along the sidewalk. The sub-goal planner execution 1006 can return a goal on a ramp on the other side of the street. Similarly, the controller can be more aggressive while crossing the street to reduce the time spend on the road. Alternatively, the sub-goal planner execution 1006 can return other goals based on the segment type. So, when the navigation server 906 switches on the sub-goal planner execution 1006 by the switch sub-goal planner request 1005, the sub-goal planner request 1005 can specify one of multiple algorithms to be used, a set of one or more parameters to be used to change behavior of the algorithms for different navigation segments. The navigation server 906 can switch on a planner execution 1008 by sending a switch planner request 1009 to the planner execution 1008. The planner execution 1008 sends a result 1011 back to the navigation server 906, acknowledging the switch planner request 1009. The navigation server 906 can switch on a controller execution 1010 by sending a controller planner request 1013 to the controller execution 1010. The controller execution 1010 sends a result 1015 back to the navigation server 906, acknowledging the switch on the controller execution 1010.

FIG. 11 is a sequence diagram of a method 1100 of a planning loop of a navigation server of the autonomous delivery robot system according to one embodiment. As part of the planning loops at blocks 923 or 939 of FIGS. 9A-9B, the method 1000 can be performed. The navigation server 906 can retrieve a next waypoint by sending a get next waypoint request 1101 from a route manager 1104. The route manager 604 may correspond to the route manager 604 described above. The route manager 1104 can get the next waypoint and return a response 1103 with the next waypoint to the navigation server 906. The navigation server 906 can request a sub-goal by sending a get sub-goal request 1105 to the sub-goal planner execution 1006. As part of determining a sub-goal, the sub-goal planner execution 1006 can send a get cost layer request 1109 to the perception system 908 to obtain cost layer data. The perception system 908 can execute a perception map loop 1112. The planning loop 923, 939 can update at a first specified rate, such as 5 Hz. The perception map loop 1112 can update at a second specified rate, such as 15 Hz. The perception map loop 1112 of the perception system 908 can return cost layer data 1111 responsive to the get cost layer request 1109. Using the cost layer data 1111, the sub-goal planner execution 1006 can determine a sub-goal and send a sub-goal result 1107 to the navigation server 906. The navigation server 906 can send a get path request 113 to the planner execution 1008. As part of determining a path, the planner execution 1008 can send a get cost layer request 1117 from the perception system 908. The perception map loop 1112 of the perception system 908 can return cost layer data 1119 responsive to the get cost layer request 1117. Using the cost layer data 1119, the planner execution 1008 can determine a path and send a get path result 1115 to the navigation server 906.

With the sub-goal result 1107 and the path result 1115, the navigation server 906 can set a new plan for the controller execution 1010 by sending a set new plan request to the controller execution 1010. The controller execution 1010 can perform a controller loop 1114. The navigation server 906 can instruct the controller execution 1010 to start moving by sending a start moving request 1123. While performing the new plan, the controller loop 1114 can send a get cost layer request 1127 to the perception system 908 to obtain cost layer data. The perception map loop 1112 can update at a second specified rate, such as 15 Hz. The perception map loop 1112 of the perception system 908 can return cost layer data 1129 responsive to the get cost layer request 1127. Using the cost layer data 1129, the controller execution 1010 can determine whether the path becomes blocked by obstacles. The controller loop 1114 can execute until the robot reaches the final waypoint. The perception map loop 1112 executes during the lifecycle of the navigation server node.

The navigation server 906 can send one or more check status requests 1125 to the controller execution 1010 and the controller execution 1010 sends a status 1137 back to the navigation server 906. Once the waypoint is reached, the navigation server 906 can determine if the segment is complete by sending a segment complete request 1131 to the route manager 1104 and the route manager 1104 sends a segment completion status 1133. The segment is considered completed when the robot reaches the final waypoint in the segment. If the segment is not completed, the planning loop 923 (or 939) returns to get the next waypoint, by sending the get next waypoint request 1101 to the route manager 1104. If the segment complete status 1133 indicates that the segment is complete, the planning loop 923 (or 939) exits or one or more components return an error.

In one embodiment, the route manager 1104, the controller execution 1010 and the perception map loop 1112 of the perception system 908 execute in separate threads. In other embodiments, any combination of threads can be used to execute the various operations described herein.

Figure 12:
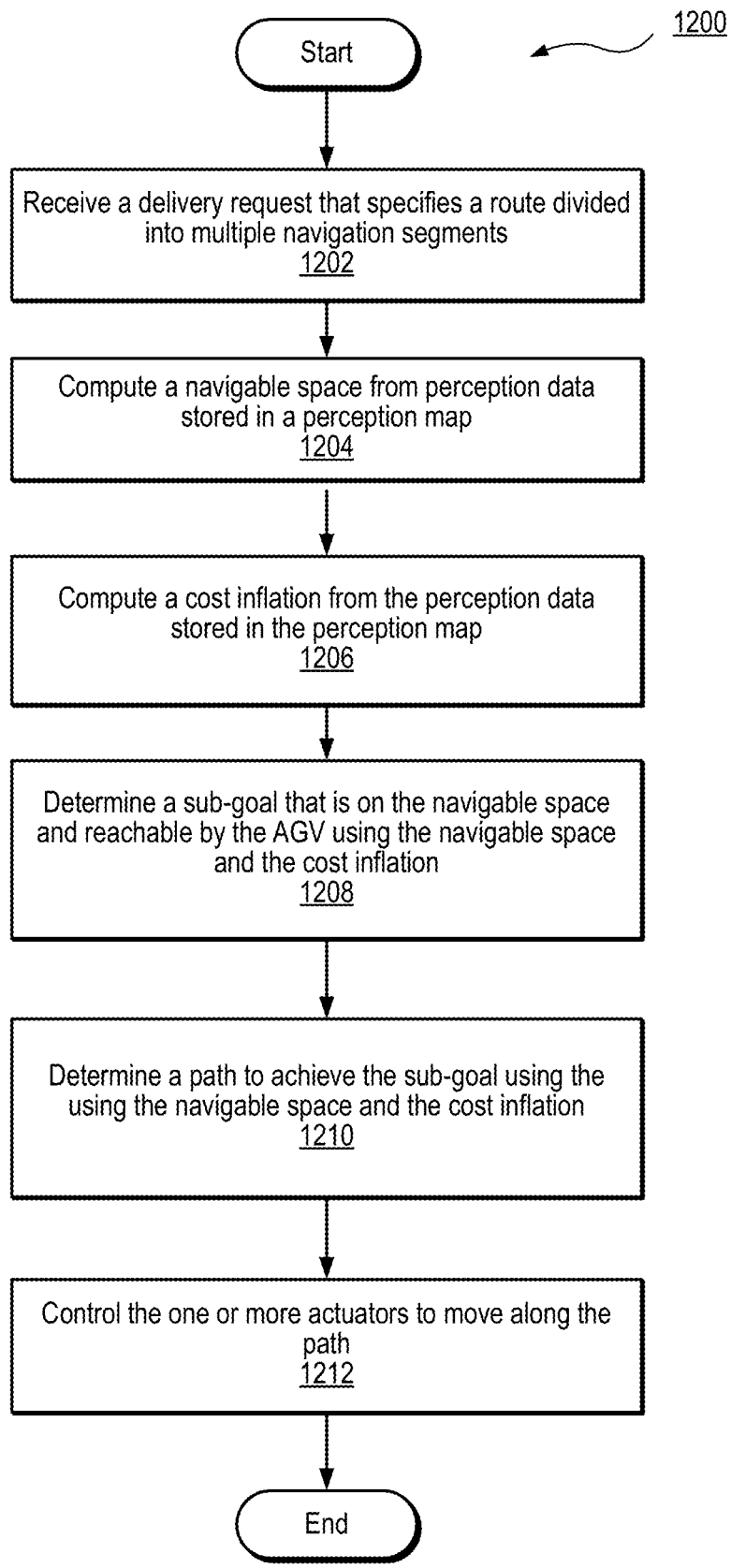
FIG. 12 is a flow diagram of a method of delivering of a product to a customer by an autonomous delivery robot system according to one embodiment.

FIG. 12 is a flow diagram of a method 1200 of delivering of a product to a customer by an autonomous delivery robot system according to one embodiment. The method 1200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1200 is performed by the autonomous delivery robot system 100 of FIG. 1. In another embodiment, the method 1200 is performed by the AGV 104 of FIG. 1, the AGV 200 of FIG. 2, the navigation server framework 600 of FIG. 6, or the like. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 12, the method 1200 begins by the processing logic receiving a delivery request that specifies a route divided into multiple navigation segments (block 1202). The processing logic computes a navigable space from perception data stored in a perception map (block 1204). The perception map is a robot-centered local map that stores the perception data, which is indicative of the surroundings of the AGV, and the processing logic updates the perception data as the AGV moves along the route. The processing logic computes a cost inflation from the perception data stored in the perception map (block 1206). The processing logic determines a sub-goal that is on the navigable space and reachable by the AGV using the navigable space and the cost inflation (block 1208). The processing logic determines a path to achieve the sub-goal using the using the navigable space and the cost inflation (block 1210). The processing logic controls the one or more actuators to move along the path (block 1212), and the method 1200 ends.

In a further embodiment, the processing logic obtains one or more color images; one or more depth images, or any combination thereof. The processing logic stores one or more segmented images derived from the one or more color images. The processing logic detects and tracks one or more ground plane types in the segmented images and detects and tracks one or more obstacles in the depth images.

In a further embodiment, where the routes is a delivery route divided into multiple segments and where each segment is a sidewalk, a crosswalk approach, or a crosswalk, the processing logic transforms a set of waypoints of the delivery route to a perception map frame. The perception map frame is a robot-centered local map that is aligned with a baselink frame of the AGV and an odom frame. The processing logic computes the navigable space from the perception data stored in the perception map based on a segment type of a current segment in which the AGV is moving. The processing logic computes the cost inflation based on the segment type of the current segment and determines the sub-goal that is on the navigable space and reachable by the AGV using the navigable space and the cost inflation and the segment type. In a further embodiment, the processing logic initializes the delivery route and executes a current segment in which the AGV is currently located. The processing logic tracks a position of the AGV in a directional route graph. The processing logic determines a next waypoint of the set of waypoints. The next waypoint is within a reachable distance of the perception map and moves the AGV forward in the directional route graph towards an end destination of the delivery route. The processing logic tracks the perception data indicative of the surroundings of the AGV and updates the perception data as the AGV moves along the delivery route.

In another embodiment, the processing logic determines that a next waypoint of the set of waypoints is not on a navigable space due to at least one of a localization error, an annotation error, or an obstacle and to map the next waypoint to the sub-goal.

Figure 13:
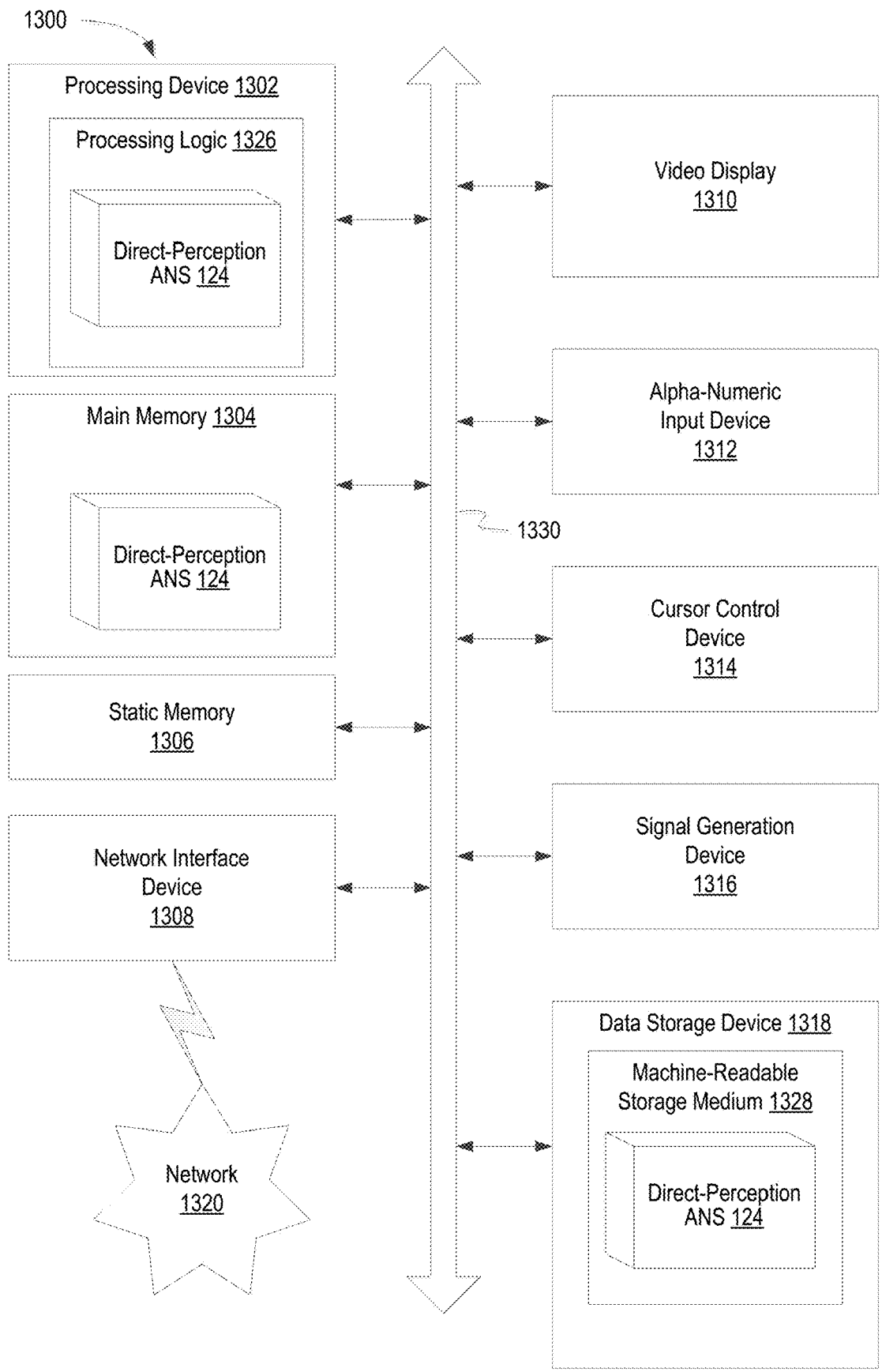
FIG. 13 illustrates a diagrammatic representation of a machine in the example form of a computer system including a set of instructions executable by a computer to deliver a product to a customer by autonomous delivery robot system according to any one or more of the methodologies discussed herein.

FIG. 13 illustrates a diagrammatic representation of a machine in the example form of a computer system 1300 including a set of instructions executable by a computer to deliver a product to a customer by autonomous delivery robot system according to any one or more of the methodologies discussed herein. In one embodiment, the computer may include instructions to enable execution of the processes and corresponding components shown and described in connection with FIGS. 1-12.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 1300 includes a processing device (processor) 1302, a main memory 1304 (e.g., read-only memory (ROM), flash memory, dynamic random access memory (DRAM) such as synchronous DRAM (SDRAM)), a static memory 1306 (e.g., flash memory, static random access memory (SRAM)), and a data storage device 1318, which communicate with each other via a bus 1330.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. In various implementations of the present disclosure, the processing device 1302 is configured to execute instructions for the direct-perception ANS 124 for performing the operations and processes described herein.

The computer system 1300 may further include a network interface device 1308. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a computer-readable storage medium 1328 (or machine-readable medium) on which is stored one or more sets of instructions of the direct-perception ANS 124 embodying any one or more of the methodologies or functions described herein. The instructions may also reside, completely or at least partially, within the main memory 1304 and/or within processing logic 1326 of the processing device 1302 during execution thereof by the computer system 1300, the main memory 1304 and the processing device 1302 also constituting computer-readable media.

The instructions may further be transmitted or received over a network 1320 via the network interface device 1308. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An autonomous delivery robot system to enable delivery of a product to a customer, the autonomous delivery robot system comprising:
   a delivery container to store the product; and
   an autonomous ground vehicle (AGV) coupled to the delivery container, wherein the AGV comprises:
     a memory device;
     a propulsion system of one or more motorized actuators;
     a processing device coupled to the memory device and the propulsion system, wherein the processing device to execute a localization system, a perception system, a propulsion controller system, and a direct-perception autonomous navigation system (ANS) for navigating directly from perception data without pre-mapping, wherein the direct-perception ANS is to:
       receive a delivery request comprising a delivery route divided into a plurality of navigation segments, each of the plurality of navigation segments being at least one of a sidewalk, a crosswalk approach, or a crosswalk and comprising a set of global positioning system (GPS) waypoints;
       transform the set of GPS waypoints to a perception map frame managed by the localization system, wherein the perception map frame is a robot-centered local map;
       set a segment type of a first segment of the delivery route with the perception system, wherein the perception system, based on the segment type, computes a navigable space from semantic segmentation data and computes a cost inflation from obstacle data;
       for each of the set of GPS waypoints of the first segment,
         determine a sub-goal based on the navigable space and the cost inflation computed by the perception system, wherein the sub-goal corresponds to a movement that is achievable by the AGV, in a direction of the delivery route, and is navigable by the AGV based on the segment type;
         determine a path using the sub-goal and the navigable space and the cost inflation computed by the perception system;
         set a new plan, comprising the path, with the propulsion controller system to move the AGV along the path; and
         start movement of the AGV along the path by the propulsion controller system.

2. The autonomous delivery robot system of claim 1, wherein the AGV further comprises:
   color cameras to obtain color images, wherein the direct-perception ANS tracks ground plane types in three-segmented images derived from the color images; and
   stereo cameras to obtain depth images, wherein the direct-perception ANS detects obstacles above a ground plane using the depth images, wherein the propulsion control system receives the navigable space and the cost inflation computed by the perception system and determines whether the path is obstructed.

3. The autonomous delivery robot system of claim 1, wherein the direct-perception ANS comprises:
   a navigation server executed by a first execution thread, the navigation server initializes the delivery route and executes each of the plurality of navigation segments of the delivery route;
   a route manager of the localization system, the route manager executed by a second execution thread, wherein the route manager tracks a position of the AGV in a directional route graph and provides a next waypoint of the set of GPS waypoints to the navigation server, wherein the next waypoint is within a reachable distance of the perception map frame, wherein the route manager ensures that the AGV moves forward in the directional route graph towards an end destination of the delivery route; and
   a perception map loop of the perception system, the perception map loop executed by a third execution thread, wherein the perception map loop tracks perception information about current surroundings of the AGV and moves the perception map frame as the AGV moves.

4. The autonomous delivery robot system of claim 3, wherein the perception map loop of the perception system comprises:
   a first perception map asynchronous layer that tracks ground plane types in three-segmented images in the semantic segmentation data;
   a second perception map asynchronous layer that detects an obstacle above a ground plane using depth images in the obstacle data; and
   a perception map synchronous layer to compute the navigable space from the semantic segmentation data and the cost inflation from the obstacle data based on the segment type.

5. The autonomous delivery robot system of claim 3, wherein the direct-perception ANS further comprises:
   a sub-goal planner executed by a fourth execution thread, wherein the sub-goal planner determines that the next waypoint is not on a navigable space due to at least one of a localization error, an annotation error, or an obstacle and maps the next waypoint to the sub-goal;
   a planner executed by a fifth execution thread, wherein the planner determines the path using the sub-goal and provides the path to the navigation server; and
   a controller executed by a sixth execution thread, wherein the controller generates, using the plan, specific movements to be made by the AGV to move along the path.

6. An autonomous ground vehicle (AGV) comprising:
   one or more motorized actuators;
   a memory device; and
   a processing device operatively coupled to the memory device and the one or more motorized actuators, the processing device to:

receive a delivery request comprising a route divided into a plurality of navigation segments, wherein the plurality of navigation segments comprises at least two segment types;

compute a navigable space, from perception data stored in a perception map based on a segment type of a current segment of the plurality of navigation segments in which the AGV is moving, the perception data indicative of the surroundings of the AGV, wherein the perception map is a robot-centered local map that stores the perception data and updates the perception data as the AGV moves along the route;

compute a cost inflation, from the perception data stored in the perception map, based on the segment type of the current segment;

determine a sub-goal that is on the navigable space and reachable by the AGV using the navigable space and the cost inflation;

determine a path to achieve the sub-goal using the navigable space and the cost inflation; and control the one or more motorized actuators to move along the path.

7. The AGV of claim 6, wherein the perception data stored in the perception map comprises semantic segmentation data and obstacle data, wherein the processing device is to navigate the AGV directly from the perception data stored in the perception map as the AGV moves along the route.

8. The AGV of claim 6, further comprising:
a first camera to obtain one or more color images;
a second camera to obtain one or more depth images, wherein the perception data stored in the perception map comprises one or more segmented images derived from the one or more color images and the depth images, wherein the processing device is further to:
detect and track one or more ground plane types in the segmented images; and
detect and track one or more obstacles in the depth images.

9. The AGV of claim 6, wherein the route is a delivery route divided into the plurality of navigation segments, each of the plurality of navigation segments being at least one of a sidewalk, a crosswalk approach, or a crosswalk and comprising a set of global positioning system (GPS) waypoints, wherein the processing device is further to:
transform the set of GPS waypoints to a perception map frame, wherein the perception map frame is a robot-centered local map frame.

10. The AGV of claim 6, wherein the route is a delivery route divided into the plurality of navigation segments comprising a set of waypoints, wherein the processing device is further to:
execute a navigation server by a first execution thread, the navigation server to initialize the delivery route and executes a segment of the plurality of navigation segments;
execute a route manager by a second execution thread, wherein the route manager to track a position of the AGV in a directional route graph and provide a next waypoint of the set of waypoints to the navigation server, wherein the next waypoint is within a reachable distance of the perception map, wherein the next waypoint is to move the AGV forward in the directional route graph towards an end destination of the delivery route; and
execute a perception map loop by a third execution thread, wherein the perception map loop to track the perception data indicative of the surroundings of the AGV and update the perception data as the AGV moves along the delivery route.

11. The AGV of claim 10, wherein the processing device is further to:
execute a sub-goal planner by a fourth execution thread, wherein the sub-goal planner to determine that a next waypoint is not on a navigable space due to at least one of a localization error, an annotation error, or an obstacle and to map the next waypoint to the sub-goal; and
execute a planner by a fifth execution thread, wherein the planner to determine the path using the sub-goal and provide the path to the navigation server.

12. The AGV of claim 6, wherein the route is a delivery route divided into the plurality of navigation segments comprising a set of waypoints, wherein the perception data comprises semantic segmentation data and obstacle data, wherein the processing device is further to:
execute a first perception map asynchronous layer to track ground plane types in three-segmented images in the semantic segmentation data;
execute a second perception map asynchronous layer to detect an obstacle above a ground plane using depth images in the obstacle data; and
execute a perception map synchronous layer to compute the navigable space from the semantic segmentation data and the cost inflation from the obstacle data based on the segment type of the current segment of the plurality of navigation segments.

13. The AGV of claim 6, wherein the processing device is further to execute a robot operating system (ROS), a localization system, a perception system comprising the perception map, a propulsion controller system, and a direct-perception autonomous navigation system (ANS) for navigating directly from the perception data without pre-mapping, wherein the direct-perception ANS comprises a ROS service interface with a task manager, a first ROS action library interface and a first ROS topic interface with the localization system, and a second ROS action library interface and a second ROS topic interface with the perception system.

14. The AGV of claim 13, wherein the route is a delivery route divided into the plurality of navigation segments comprising a set of waypoints, wherein the direct-perception ANS comprises:
a mobility manager to provide the ROS service interface to the task manager to start, pause, resume, or cancel the delivery route; and
a navigation server to initialize the delivery route and execute a segment of the plurality of navigation segments.

15. The AGV of claim 14, wherein the direct-perception ANS further comprises:
a sub-goal planner execution block to determine that a next waypoint of the set of waypoints is not on a navigable space due to at least one of a localization error, an annotation error, or an obstacle and map the next waypoint to the sub-goal;
a planner execution block to determine the path using the sub-goal and provide the path to the navigation server;
a route manager to track a position of the AGV in a directional route graph and provide the next waypoint of the set of waypoints to the navigation server;
a perception map loop tracks perception information about current surroundings of the AGV and moves the perception map as the AGV moves; and a controller execution block to control the one or more motorized actuators.

16. A method comprising:

receiving, by a processing device of an autonomous ground vehicle (AGV), a delivery request comprising a route divided into a plurality of navigation segments, wherein the plurality of navigation segments comprises at least two segment types;

computing, by the processing device, a navigable space from perception data stored in a perception map based on a segment type of a current segment of the plurality of navigation segments in which the AGV is moving, the perception data indicative of the surroundings of the AGV, wherein the perception map is a robot-centered local map that stores the perception data and updates the perception data as the AGV moves along the route;

computing a cost inflation from the perception data stored in the perception map, based on the segment type of the current segment;

determining a sub-goal that is on the navigable space and reachable by the AGV using the navigable space and the cost inflation;

determining a path to achieve the sub-goal using the using the navigable space and the cost inflation; and controlling one or more actuators to move the AGV along the path.

17. The method of claim 16, further comprising:

obtaining one or more color images;

obtaining one or more depth images;

storing one or more segmented images derived from the one or more color images;

detecting and tracking one or more ground plane types in the segmented images; and detecting and tracking one or more obstacles in the depth images.

18. The method of claim 16, wherein the route is a delivery route divided into the plurality of navigation segments, each of the plurality of navigation segments being at least one of a sidewalk, a crosswalk approach, or a crosswalk and comprising a set of waypoints, wherein the method further comprises:

transforming the set of waypoints to a perception map frame, wherein the perception map frame is a robot-centered local map frame that is aligned with a baselink frame of the AGV and an odom frame.

19. The method of claim 18, further comprising:

initializing the delivery route;

executing a segment of the plurality of navigation segments;

tracking a position of the AGV in a directional route graph;

determining a next waypoint of the set of waypoints, wherein the next waypoint is within a reachable distance of the perception map frame, wherein the next waypoint is to move the AGV forward in the directional route graph towards an end destination of the delivery route;

tracking the perception data indicative of the surroundings of the AGV; and updating the perception data as the AGV moves along the delivery route.

20. The method of claim 18, further comprising:

determining that a next waypoint of the set of waypoints is not on a navigable space due to at least one of a localization error, an annotation error, or an obstacle and to map the next waypoint to the sub-goal.

* * * * *